United States Patent
Sinnet et al.

(10) Patent No.: US 12,082,742 B2
(45) Date of Patent: Sep. 10, 2024

(54) AUTOMATED BIN SYSTEM FOR ACCEPTING FOOD ITEMS IN ROBOTIC KITCHEN WORKSPACE

(71) Applicant: Miso Robotics, Inc., Pasadena, CA (US)

(72) Inventors: Ryan W. Sinnet, Pasadena, CA (US); Abhimanyu Bhakuni, Pasadena, CA (US); William Guffey, Los Angeles, CA (US); Ryan R. Wach, Valencia, CA (US); Robert Anderson, Pasadena, CA (US)

(73) Assignee: Miso Robotics, Inc., Pasadena, CA (US)

( * ) Notice: Subject to any disclaimer, the term of this patent is extended or adjusted under 35 U.S.C. 154(b) by 0 days.

(21) Appl. No.: 17/727,363

(22) Filed: Apr. 22, 2022

(65) Prior Publication Data
US 2022/0346598 A1  Nov. 3, 2022

Related U.S. Application Data

(60) Provisional application No. 63/182,912, filed on May 1, 2021.

(51) Int. Cl.
*A23L 5/10* (2016.01)
*A47J 37/12* (2006.01)
(Continued)

(52) U.S. Cl.
CPC .............. *A47J 37/1219* (2013.01); *A23L 5/11* (2016.08); *A47J 37/1228* (2013.01);
(Continued)

(58) Field of Classification Search
CPC .. A23L 5/11; A47J 36/32; A47J 36/321; A47J 37/12; A47J 37/1219; A47J 37/1228;
(Continued)

(56) References Cited

U.S. PATENT DOCUMENTS 1,760,462 A * 5/1930 Yeo .......................... E05G 7/001
109/66
2,658,444 A 11/1953 Wheeler
(Continued)

FOREIGN PATENT DOCUMENTS

CN     110279287 A  *  9/2019
DE     202014001807 U1   3/2014
(Continued)

OTHER PUBLICATIONS

B. Siciliano & O. Khatib, Handbook of Robotics, published by Springer-Verlag Berlin (2008).
(Continued)

*Primary Examiner* — Drew E Becker
*Assistant Examiner* — Austin Parker Taylor
(74) *Attorney, Agent, or Firm* — Batt IP A Law Corporation; Richard Batt

(57) ABSTRACT

A robotic kitchen system for preparing food items in combination with at least one kitchen appliance such as a fryer comprises an automated bin assembly, a robotic arm, and a basket held by the robotic arm. The automated bin assembly comprises at least one automated bin for holding the food items. A camera or sensor array collects image data of the food items in the bin(s). A central processor is operable to compute and provide directions to the first robotic arm and automated bin assembly based on the image data and stored data to (a) move the robotic arm to the bin; (b) actuate the bin to drop the food items from the bin into the basket; (c) and to move the basket into the fryer all without human interaction. Related methods are also described.

9 Claims, 29 Drawing Sheets

(51) Int. Cl.
  *A47J 44/00* (2006.01)
  *B25J 9/16* (2006.01)
  *B25J 11/00* (2006.01)
  *B25J 13/08* (2006.01)
  *B65G 11/02* (2006.01)
  *B25J 9/00* (2006.01)

(52) U.S. Cl.
  CPC ........... *A47J 37/1266* (2013.01); *A47J 44/00* (2013.01); *B25J 9/1697* (2013.01); *B25J 11/0045* (2013.01); *B25J 13/08* (2013.01); *B65G 11/023* (2013.01); *A23V 2002/00* (2013.01); *B25J 9/0087* (2013.01)

(58) Field of Classification Search
  CPC .... A47J 37/1266; A47J 37/1295; A47J 44/00; B25J 9/1697; B25J 11/0045; B25J 13/08; B65G 11/023; A47G 29/14; E05G 7/008; A47F 2009/041; Y10S 198/95
  USPC ....... 426/231, 438; 99/325, 326, 329 R, 331, 99/334, 336
  See application file for complete search history.

(56) References Cited

U.S. PATENT DOCUMENTS

| | | | |
|---|---|---|---|
| 3,302,871 A * | 2/1967 | Kettering | E05G 7/008 232/43.4 |
| 4,015,494 A | 4/1977 | Spooner et al. | |
| 4,052,319 A | 10/1977 | Friedman | |
| 4,545,723 A | 10/1985 | Clark | |
| 4,853,771 A | 8/1989 | Witriol et al. | |
| 4,919,950 A | 4/1990 | Mak | |
| 4,922,435 A | 5/1990 | Cahlander et al. | |
| 4,979,864 A * | 12/1990 | Cahlander | B65G 65/23 414/420 |
| 5,132,914 A | 7/1992 | Cahlander et al. | |
| 5,230,279 A * | 7/1993 | McFadden | A47J 37/1228 99/357 |
| 5,285,604 A | 2/1994 | Carlin | |
| 5,386,762 A | 2/1995 | Gokey | |
| 5,389,764 A | 2/1995 | Nishii et al. | |
| 5,458,384 A | 10/1995 | Liu et al. | |
| 5,466,025 A | 11/1995 | Mee | |
| 5,833,295 A | 11/1998 | Farlow, Jr. | |
| 5,893,051 A | 4/1999 | Tomohiro | |
| D412,642 S | 8/1999 | King | |
| D492,112 S | 6/2004 | Hardy | |
| 7,174,830 B1 | 2/2007 | Dong | |
| 7,383,963 B2 | 6/2008 | Svabek et al. | |
| 7,920,962 B2 | 4/2011 | D'Andrea et al. | |
| 7,971,450 B2 | 7/2011 | Furlanetto et al. | |
| 8,276,505 B2 | 10/2012 | Buehler | |
| 8,610,037 B2 | 12/2013 | Polt | |
| D702,084 S | 4/2014 | Matos | |
| 8,820,313 B1 | 9/2014 | Lutes | |
| 9,220,371 B1 | 12/2015 | Demirakos et al. | |
| 9,233,470 B1 | 1/2016 | Bradski et al. | |
| 9,285,589 B2 | 3/2016 | Osterhout et al. | |
| 9,483,875 B2 | 11/2016 | Theimer et al. | |
| 9,538,880 B2 | 1/2017 | Riefenstein | |
| 9,542,621 B2 | 1/2017 | He et al. | |
| 9,785,911 B2 | 10/2017 | Galluzzo et al. | |
| 9,815,191 B2 | 11/2017 | Oleynik et al. | |
| 10,005,184 B2 | 6/2018 | Gerio et al. | |
| D825,266 S | 8/2018 | Iorio et al. | |
| 10,112,771 B2 | 10/2018 | D'andrea et al. | |
| 10,154,756 B2 | 12/2018 | Hall et al. | |
| 10,293,488 B2 | 5/2019 | Hall et al. | |
| 10,682,765 B2 | 6/2020 | Mirkhaef et al. | |
| 10,919,144 B2 | 2/2021 | Sinnet et al. | |
| 11,167,421 B2 | 11/2021 | Sinnet | |
| 11,351,673 B2 | 6/2022 | Zito et al. | |
| 11,518,044 B2 | 12/2022 | Liu et al. | |
| 11,577,401 B2 | 2/2023 | Sinnet et al. | |
| 11,738,934 B2 * | 8/2023 | Jain | B67D 1/06 700/246 |
| 2002/0028127 A1 | 3/2002 | Hart et al. | |
| 2002/0082924 A1 | 6/2002 | Koether | |
| 2004/0011321 A1 | 1/2004 | Hawaj | |
| 2004/0111321 A1 | 6/2004 | Kargman | |
| 2004/0154474 A1 | 8/2004 | Chan | |
| 2004/0172380 A1 | 9/2004 | Zhang et al. | |
| 2005/0036668 A1 | 2/2005 | McLennan et al. | |
| 2005/0049940 A1 | 3/2005 | Tengler et al. | |
| 2005/0193901 A1 | 9/2005 | Buehler | |
| 2006/0278216 A1 | 12/2006 | Gagas et al. | |
| 2007/0122000 A1 | 5/2007 | Venetianer et al. | |
| 2008/0110347 A1 | 5/2008 | Wong | |
| 2009/0192921 A1 | 7/2009 | Hicks | |
| 2009/0210090 A1 | 8/2009 | Takemitsu et al. | |
| 2009/0262206 A1 | 10/2009 | Park | |
| 2010/0132692 A1 | 6/2010 | Shaffer | |
| 2010/0182136 A1 | 7/2010 | Pryor | |
| 2010/0296903 A1 | 11/2010 | Shah et al. | |
| 2011/0153614 A1 | 6/2011 | Solomon | |
| 2011/0264266 A1 | 10/2011 | Kock | |
| 2012/0024170 A1 | 2/2012 | Fritz-Jung et al. | |
| 2013/0033057 A1 | 2/2013 | Markham | |
| 2013/0275236 A1 | 10/2013 | Koke et al. | |
| 2013/0302483 A1 | 11/2013 | Riefenstein | |
| 2014/0031978 A1 | 1/2014 | Takata | |
| 2014/0062112 A1 | 3/2014 | Cho | |
| 2014/0089299 A1 | 3/2014 | Kamei et al. | |
| 2014/0157698 A1 | 6/2014 | Cihak et al. | |
| 2014/0184496 A1 | 7/2014 | Gribetz et al. | |
| 2014/0203012 A1 | 7/2014 | Corona et al. | |
| 2014/0234066 A1 | 8/2014 | Mathi et al. | |
| 2014/0324607 A1 | 10/2014 | Frehn et al. | |
| 2014/0334691 A1 | 11/2014 | Cho et al. | |
| 2014/0351068 A1 | 11/2014 | Renfroe | |
| 2014/0363266 A1 | 12/2014 | Cooper | |
| 2015/0019354 A1 | 1/2015 | Chan et al. | |
| 2015/0290795 A1 | 10/2015 | Oleynik | |
| 2015/0310624 A1 | 10/2015 | Bulan et al. | |
| 2016/0037958 A1 | 2/2016 | Freymiller et al. | |
| 2016/0078694 A1 | 3/2016 | Swift | |
| 2016/0180546 A1 | 6/2016 | Kim et al. | |
| 2016/0239705 A1 | 8/2016 | Masood et al. | |
| 2016/0293470 A1 | 10/2016 | Oremus et al. | |
| 2016/0307459 A1 | 10/2016 | Chestnut et al. | |
| 2016/0327279 A1 | 11/2016 | Bhogal et al. | |
| 2016/0327281 A1 | 11/2016 | Bhogal et al. | |
| 2016/0334799 A1 | 11/2016 | D'Andrea et al. | |
| 2016/0368742 A1 * | 12/2016 | Maile | B66C 3/00 |
| 2017/0011319 A1 | 1/2017 | Elliot et al. | |
| 2017/0024789 A1 | 1/2017 | Frehn et al. | |
| 2017/0030515 A1 | 2/2017 | Johnson et al. | |
| 2017/0116661 A1 | 4/2017 | Sundaram | |
| 2017/0130968 A1 | 5/2017 | Nagraj et al. | |
| 2017/0154803 A1 | 6/2017 | Wang et al. | |
| 2017/0169315 A1 | 6/2017 | Vaca et al. | |
| 2017/0178070 A1 | 6/2017 | Wang et al. | |
| 2017/0206431 A1 | 7/2017 | Sun et al. | |
| 2017/0252922 A1 | 9/2017 | Levine et al. | |
| 2017/0290345 A1 | 10/2017 | Garden et al. | |
| 2017/0305015 A1 | 10/2017 | Krasny et al. | |
| 2017/0348854 A1 | 12/2017 | Oleynik | |
| 2017/0364073 A1 | 12/2017 | Guy | |
| 2018/0046978 A1 * | 2/2018 | Tartal | G06Q 20/203 |
| 2018/0150661 A1 | 5/2018 | Hall et al. | |
| 2018/0339463 A1 | 11/2018 | Stone et al. | |
| 2018/0345485 A1 | 12/2018 | Sinnet et al. | |
| 2018/0365630 A1 | 12/2018 | Seals et al. | |
| 2019/0176338 A1 * | 6/2019 | Zito | G06Q 50/12 |
| 2019/0200797 A1 * | 7/2019 | Diao | G05B 19/42 |
| 2019/0256301 A1 | 8/2019 | Hashimoto et al. | |
| 2019/0297899 A1 | 10/2019 | Weiss | |
| 2019/0352028 A1 | 11/2019 | Mirkhaef et al. | |
| 2019/0389082 A1 | 12/2019 | Higo | |
| 2020/0009638 A1 | 1/2020 | Asada et al. | |
| 2020/0030966 A1 | 1/2020 | Hasegawa et al. | |
| 2020/0046168 A1 | 2/2020 | Sinnet et al. | |

(56) References Cited

U.S. PATENT DOCUMENTS

| | | | |
|---|---|---|---|
| 2020/0047349 A1 | 2/2020 | Sinnet et al. | |
| 2020/0054175 A1 | 2/2020 | Roy et al. | |
| 2020/0087069 A1 | 3/2020 | Johnson et al. | |
| 2020/0121125 A1 | 4/2020 | Zito et al. | |
| 2020/0154948 A1* | 5/2020 | Grass | A47J 43/04 |
| 2020/0238534 A1 | 7/2020 | Goldberg et al. | |
| 2020/0254641 A1 | 8/2020 | Hocker et al. | |
| 2020/0337343 A1* | 10/2020 | Cretors | A23L 7/187 |
| 2021/0030199 A1 | 2/2021 | Olson et al. | |
| 2021/0038025 A1* | 2/2021 | Almblad | A47J 37/12 |
| 2021/0094188 A1 | 4/2021 | Rodionov et al. | |
| 2021/0107724 A1 | 4/2021 | Cohen | |
| 2021/0196081 A1 | 7/2021 | Kodali et al. | |
| 2021/0208171 A1 | 7/2021 | Guarracina et al. | |
| 2021/0276756 A1 | 9/2021 | Dunkel | |
| 2021/0394371 A1 | 12/2021 | Ishizu et al. | |
| 2022/0055225 A1 | 2/2022 | Sinnet et al. | |
| 2022/0324119 A1 | 10/2022 | Kodali et al. | |
| 2022/0346598 A1 | 11/2022 | Sinnet et al. | |

FOREIGN PATENT DOCUMENTS

| | | | |
|---|---|---|---|
| GB | 2547286 A | 8/2017 | |
| JP | 2004062750 A | 2/2004 | |
| JP | 2008296308 A | 12/2008 | |
| JP | 2009106734 A | 5/2009 | |
| JP | 2009297880 A | 12/2009 | |
| JP | 4655912 B2 | 3/2011 | |
| JP | 5814305 B2 | 11/2015 | |
| WO | 0170087 A2 | 9/2001 | |
| WO | 2006006624 A1 | 1/2006 | |
| WO | 2012020858 A1 | 2/2012 | |
| WO | 2015100958 A1 | 7/2015 | |
| WO | 2015143800 A1 | 10/2015 | |
| WO | 2016040361 A1 | 3/2016 | |
| WO | 2015125017 A3 | 6/2016 | |
| WO | 2016140622 A1 | 9/2016 | |
| WO | 2017114014 A1 | 7/2017 | |
| WO | 2017103682 A3 | 8/2017 | |
| WO | WO-2017218548 A1 * | 12/2017 | A47J 37/1228 |
| WO | 2018031489 A1 | 2/2018 | |
| WO | 2018165038 A1 | 9/2018 | |
| WO | 2018165105 A1 | 9/2018 | |
| WO | 2019079345 A1 | 4/2019 | |
| WO | 2022256799 A1 | 12/2022 | |

OTHER PUBLICATIONS

Beucher, Serge, and Fernand Meyer. "The morphological approach to segmentation: the watershed transformation." Optical Engineering-New Yark-Marcel Dekker Incorporated—34 (1992): 433-433.

Bonanni et al., "Counterintelligence: Augmented Reality Kitchen", CHI 2005, (Apr. 2, 2005), URL: http://citeseerx.ist.psu.edu/viewdoc/summary?doi=10.1.1.88.2875, (Jun. 12, 2018), XP055559956.

International Search Report and Written Opinion of ISA dated Jul. 11, 2018 for PCT/US2018/020948.

International Search Report and Written Opinion of ISA dated Jul. 20, 2018 for PCT/US2018/021066.

International Search Report and Written Opinion of ISA dated Aug. 17, 2022 for PCT/US2022/072666.

International Search Report and Written Opinion of ISA of PCT application No. PCT/US2022/071871 dated Sep. 1, 2022.

Kaiming He, Georgia Gkioxari, Piotr Dollar, and Ross B. Girshick, Mask R-CNN, arXiv, 2017.

Krystal B., The magic of Eatsa, explained, (Mar. 2, 2017), URL: https://www.washingtonpost.com/goingoutguide/the-magic-of-eatsa-explained-order-on-a-screen-pick-up-at-a-cubby/2017/03/02/57c95fb0-f55a-11e6-b9c9-e83fce42fb61_story.html.

Lucas, Bruce D., and Takeo Kanade. "An iterative image registration technique with an application to stereo vision." (1981): 674-679.

Ohta, Yu-Ichi, Takeo Kanade, and Toshiyuki Sakai. "Color information for region segmentation." Computer graphics and image processing 13.3 (1980): 222-241.

Paul Viola, et al., Rapid Object Detection using a Boosted Cascade of Simple Features, Accepted Conference on Computer Vision and Pattern Recognition 2001 (https://www.cs.cmu.edu/~efros/courses/LBMV07/Papers/viola-cvpr-01.pdf).

Shaoqing Ren, Kaiming He, Ross Girshick, and Jian Sun, "Faster R-CNN: Towards Real-Time Object Detection with Region Proposal Networks Faster", IEEE Transactions on Pattern Analysis and Machine Intelligence, vol. 39 Issue 6, Jun. 2017.

Goodfellow et al., Generative adversarial networks, Communications of the ACM, vol. 63, Issue 11, Nov. 2020 pp. 139-144.

Ju Yong Chang, Haesol Park, In Kyu Park, Kyoung Mu Lee, Sang Uk Lee, GPU-friendly multi-view stereo reconstruction using surfel representation and graph cuts, Computer Vision and Image Understanding, vol. 115, Issue 5, 2011, pp. 620-634.

Lin, Tsung-Yi, et al. "Focal loss for dense object detection." Proceedings of the IEEE international conference on computer vision. 2017.

Simon, Dan. "Kalman filtering." Embedded systems programming 14.6 (2001): 72-79.

Xiao-Shan Gao et al. "Complete solution classification for the perspective-three-point problem," in IEEE Transactions on Pattern Analysis and Machine Intelligence, vol. 25, No. 8, pp. 930-943, Aug. 2003.

\* cited by examiner

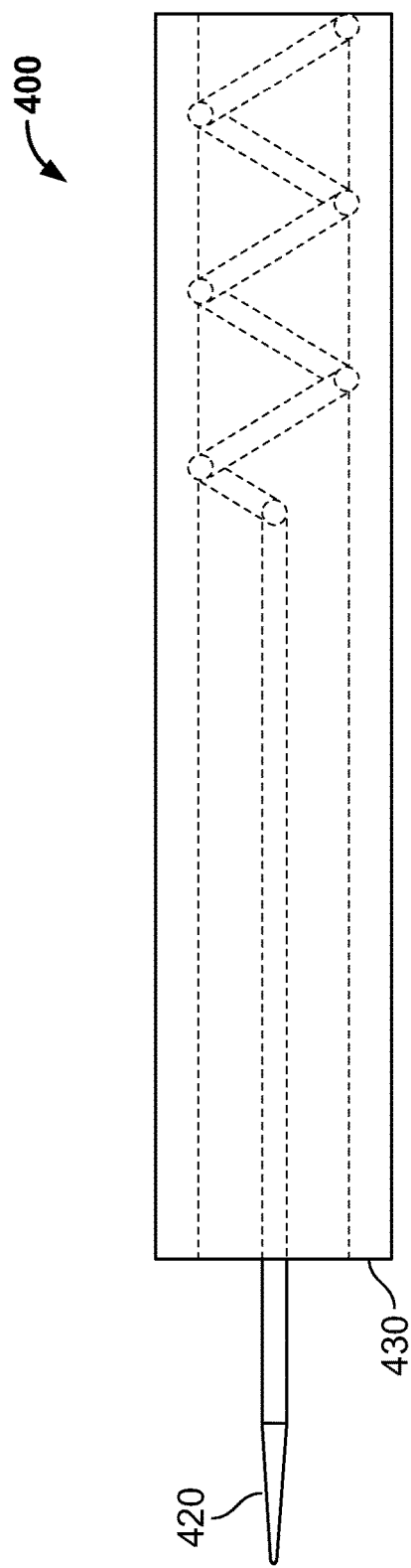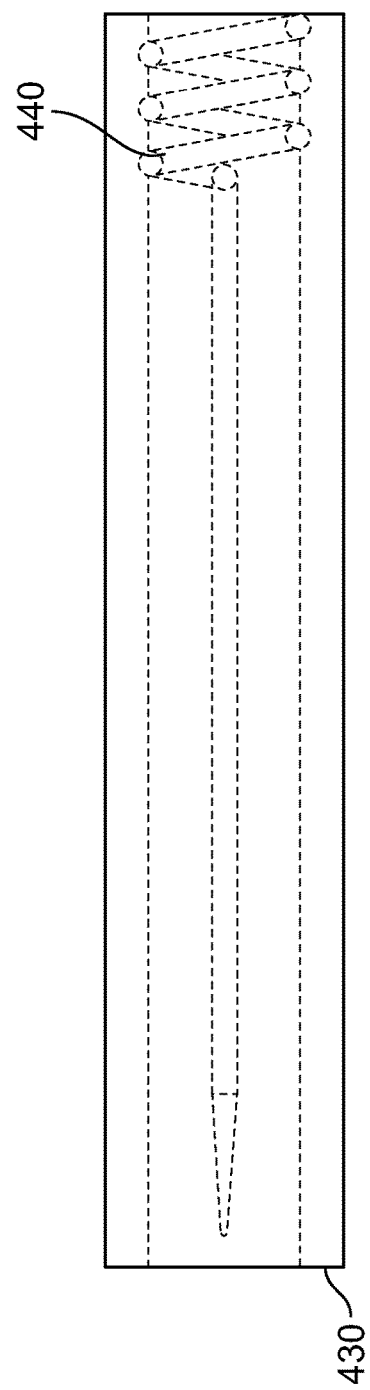
FIG. 10A
FIG. 10B

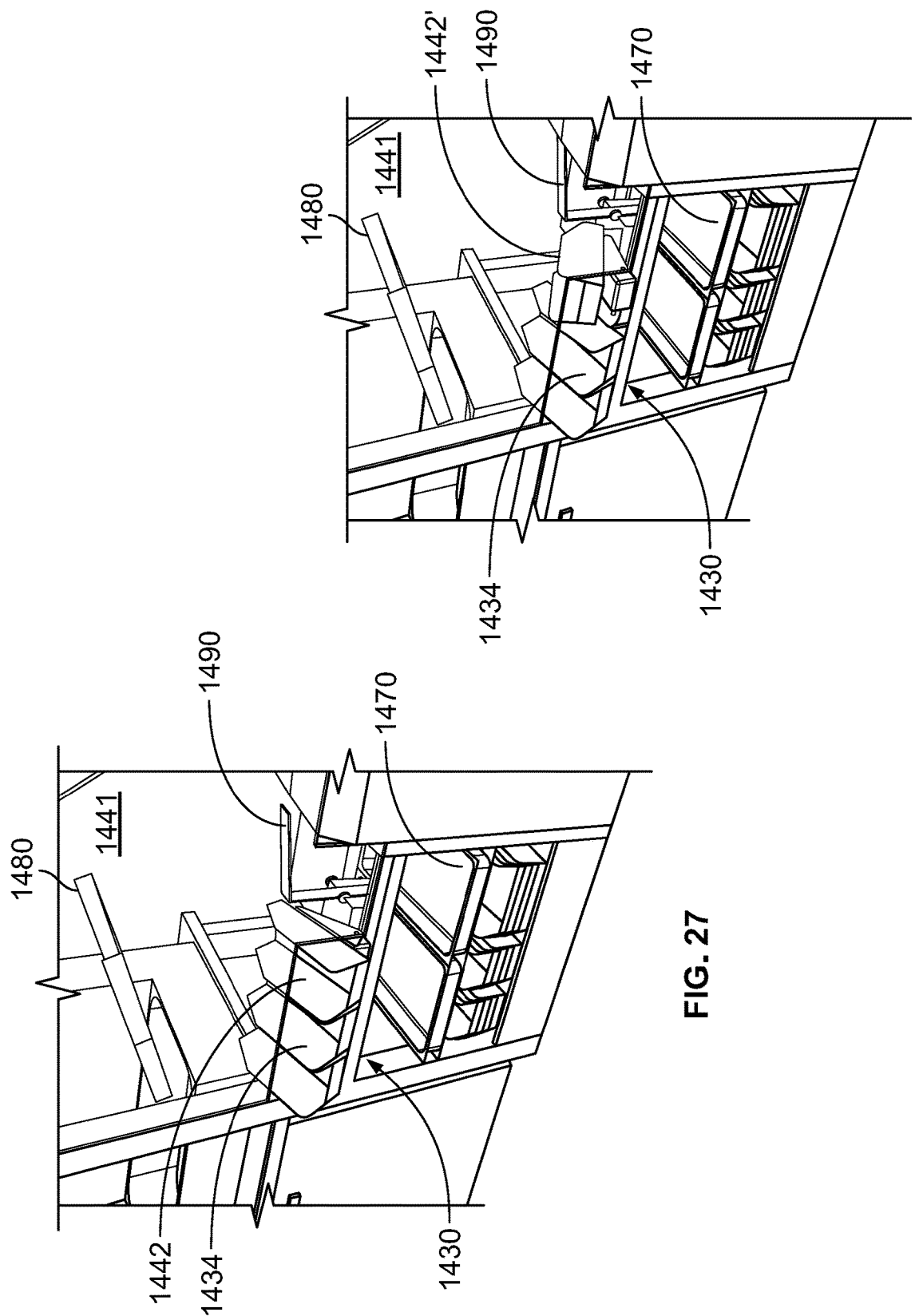

AUTOMATED BIN SYSTEM FOR ACCEPTING FOOD ITEMS IN ROBOTIC KITCHEN WORKSPACE

CROSS-REFERENCE TO RELATED APPLICATIONS

This claims priority to provisional application No. 63/182,912, filed May 1, 2021, entitled "AUTOMATED BIN SYSTEM FOR ACCEPTING FOOD ITEMS IN ROBOTIC KITCHEN WORKSPACE."

BACKGROUND OF THE INVENTION

1. Field of the Invention

This invention relates to kitchen appliances and more particularly to robotic kitchen appliances capable of performing a wide range of food preparation steps in a restaurant environment.

2. Description of the Related Art

Providing a robust and effective apparatus or combination of apparatuses to prepare food for consumers is challenging because of the wide variety of types of food, cooking techniques, kitchen appliances, kitchen tools, and utensils. Additionally, food preparation is often labor intensive and subject to human error. Workers employed by these businesses require careful and sometimes excessive training to accurately and safely prepare the food, thus increasing costs. It follows that businesses that prepare and sell food typically have high labor costs and experience large amounts of monetary and food loss as well as customer dissatisfaction due to human error.

Various commercial food preparation equipment addressed some of these challenges. The existing equipment, however, has several drawbacks. First, food preparation equipment is usually designed as a bespoke solution to perform a limited scope of work. Chaining together many different pieces into a workflow is a complex and expensive process and results in a system with highly limited capabilities yet a large footprint. Second, such food preparation equipment typically requires batch preparation of food items. For example, clamshell grills are typically designed to prepare multiple food items in batches and are not useful for preparing items individually. Third, the increased mechanical and/or electrical complexity inherent in such devices often leads to increased failure rates versus conventional, non-automated versions of such devices, resulting in higher downtimes. Such downtimes can be especially costly for restaurants because restaurants do not typically have back-up equipment onsite and consequently they may not be able to cook a number of items on their menu which reduces average order size or even drives away potential customers. Fourth, such food preparation equipment typically has a large footprint compared to conventional versions of the equipment and for the variety of items they are capable of cooking. This larger size is a challenge for restaurant owners because of the high cost of kitchen space. For example, the MasterMatic fryer is substantially larger than a similar model without the automatic conveyor. Fifth, the potential benefits of such food preparation equipment are often outweighed by their associated upfront costs. For example, automated frying equipment is significantly more expensive than conventional frying equipment. Sixth, such food preparation equipment still requires extensive involvement of kitchen workers. Seventh, most food preparation equipment doesn't interact with outside data to achieve optimal production scheduling and reduce food wasted. Because of the above challenges, use of automation in restaurant and food service operations is generally limited to spot solutions and does not take advantage of the availability of data to build accurate demand models and then use these models to automatically feed a production schedule.

Additionally, there are challenges associated with utensils for frying food items. Fry baskets are used to contain food during the cooking process in a fryer, enabling easy extraction from product. An alternative approach is termed "open-bay" cooking, where food is tossed in the fryer and then shoveled out. Baskets are traditionally made from wire or sheet metal with silicone handles to provide thermal insulation for a kitchen worker grabbing the basket. Despite the insulated handle, the worker is exposed to hot oil and hot equipment as well as the risk of slipping and falling arising from oil splatter in the vicinity of the fryer.

Accordingly, a robotic kitchen system and method that overcomes the above-mentioned challenges is desirable.

SUMMARY OF THE INVENTION

A robotic kitchen system for preparing food items in combination with at least one kitchen appliance in a commercial or restaurant kitchen comprises a robotic arm and end effector or tool, a basket held by the end effector, and an automated bin assembly in the vicinity of the robotic arm. The automated bin assembly includes a number of bins for holding the food items. A camera or sensor array is aimed towards the bins for collecting image data of the food items in the bin. A central processor is operable to compute and provide directions to the first robotic arm and automated bin assembly to (a) move the robotic arm to the bin, and (b) actuate the bin to drop the food items from the bin into the basket.

In embodiments, the central processor is further operable to compute and provide directions to the robotic arm to move the basket into a fryer after the basket receives the food items.

In embodiments, the robotic kitchen system further comprises a shield and first window or opening in the shield through which at least a portion of the bin can protrude to receive the food items from outside the shield. In embodiments, the bin is operable to rotate from a first position in which a front portion of the bin protrudes through the first window, and a second position in which the food items fall out a rear opening of the bin.

In embodiments, the central processor is further operable to compute and provide directions to transfer the food items through a second window after the food items are cooked in the fryer.

In embodiments, the robotic kitchen system further comprises a ramp or chute extending through the second window, and arranged at a downward angle such that the food items placed on the ramp slide down the ramp out the second window.

In embodiments, the automated bin status comprises a plurality of bins, each of which is automatically rotatable.

In embodiments, the robotic kitchen system comprises a plurality of fryers.

In embodiments, the robotic kitchen system further comprises a scheduling engine to determine a sequence of food preparation steps to detect and transfer the food items from each of the bins to the fryers for cooking based on a plurality of inputs selected from the group consisting of camera data, customer orders, inventory, and recipe information.

In embodiments, the robotic kitchen system further comprises a frame, to which the shield is attached, and a linear guide to which the robotic arm is movably coupled.

Automated Food Transfer Method to Robotic Kitchen Workspace

In embodiments, a method of robotically preparing food items in a commercial or restaurant kitchen having at least one kitchen appliance for cooking a food item includes the following steps: detecting the food item placed in a bin; robotically manipulating a basket underneath the bin, wherein the robotically manipulating is performed with a robotic arm; and automatically moving the bin to transfer the food items to the basket.

In embodiments, the method further comprises robotically manipulating the basket into the cooking appliance after the food item has been transferred to the basket.

In embodiments, the method further comprises classifying, using a programmed processor and image data, the food item in the bin.

In embodiments, the method further comprises determining, using a programmed processor, a cook schedule for the food item based on type of food item.

In embodiments, the method further comprises removing the basket containing the food item from the cooking appliance after the food item has been cooked.

In embodiments, the method further comprises robotically dumping the cooked food item onto a target surface. In embodiments, the target surface is a ramp, and the ramp is shaped and arranged such that the food item dumped thereon slides downward and falls into a food holding area.

In embodiments, the method further comprises providing a shield in front of the robotic arm and fryer, and wherein the shield comprises a first opening for a portion of the bin to protrude.

In embodiments, the step of automatically moving the bin is performed by rotating the bin using a motor or actuator removably coupled to the bin.

In embodiments, the method further comprises decoupling the bin from the motor and cleaning the bin.

In embodiments, the method further comprises controlling, using a programed processor, the robotic arm to robotically manipulate the basket based on image data from a camera or sensor.

In embodiments, the method further comprises controlling, using a programed processor, the bin to transfer the food item to the basket based on image data from a camera or sensor.

Automated Bin Station

An automated food bin station for transferring food items from a human to robotic kitchen assistant comprises: a bin; a motor removably coupled to the bin and operable to move the bin between a first position for receiving the food items and to a second position for dumping the food items; a sensor array for obtaining image data of the bin; a processor for detecting and classifying food items in the bin, and for instructing the motor to move the bin between the first position and the second position.

In embodiments, the automated bin station further comprises a ramp extending through the second window, and arranged at a downward angle such that the food items placed on the ramp from within the enclosure slide down the ramp out the second window.

Optionally, a sorting bin for collecting the food from the ramp is arranged below the egress end of the ramp. In embodiments, a linear rail and motor are adapted to move the sorting bin laterally and rotationally and the central processor is further operable to compute and provide directions to move the sorting bin to at least one food holding tray, and to dump the food into the food holding tray.

In a work environment requiring a human to collaboratively work with a robot, a method for securing a robot workspace from a human workspace to protect the human from injury arising from contact with the robot comprises automatically presenting an object collection zone from the robot workspace through a window in a physical barrier into the human workspace, said physical barrier separating the human workspace from the robot workspace; and automatically manipulating the object collection zone to transport an object placed in the object collection zone to the robot workspace, wherein the manipulating step is performed independent of the human and robot.

In embodiments, the method further comprises automatically detecting the object when the object is placed in the object collection zone. An example of the object is a food item such as frozen fries or chicken fingers. Examples of the object collection zone include, without limitation, a bin, chamber, container, and cart as well as space provided on a conveyor belt assembly, rack, or guide system.

In embodiments, the method further comprises positioning a cooking tool underneath a portion of the object collection zone, wherein the positioning is performed by the robot.

In embodiments, the method further comprises automatically moving the object collection zone to transfer the object to the cooking tool. An example of a cooking tool is a fry basket.

In embodiments, the method further comprises robotically moving the cooking tool to dump the object onto a pathway, wherein the pathway is configured to transport the object from inside the robot workspace to outside the robot workspace. In embodiments, the pathway is a chute, and the chute is arranged with a downward sloping angle to transport the object based on gravity.

In embodiments, the step of automatically manipulating is performed by an automated bin assembly comprising a plurality of computer controlled bins, each of which is adapted to rotate or tilt from a first orientation to receive the object from the human in the human workspace, to a second orientation to position the object inside the robot workspace.

An automated sorting station as described herein.

An automated bin station as described herein.

A method for transferring food items from a bin to a basket as described herein.

A robotic kitchen system operable to transfer food items from a bin to a basket as described herein.

The description, objects and advantages of embodiments of the present invention will become apparent from the detailed description to follow, together with the accompanying drawings.

BRIEF DESCRIPTION OF THE DRAWINGS

FIG. 10A shows a side view of the Temperature Testing Tool in the extended position in accordance with an embodiment of the present invention;

FIG. 10B shows a side view of the temperature testing tool of FIG. 10A in the retracted position;

FIG. 27 shows a plurality of automated bins arranged to receive food in accordance with an embodiment of the invention;

FIG. 28 shows the plurality of automated bins of FIG. 27 except one bin is shown in an actuated position for dumping food into a basket in accordance with an embodiment of the invention;

DETAILED DESCRIPTION OF THE INVENTION

Before the present invention is described in detail, it is to be understood that this invention is not limited to particular variations set forth herein as various changes or modifications may be made to the invention described and equivalents may be substituted without departing from the spirit and scope of the invention. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. In addition, many modifications may be made to adapt a particular situation, material, composition of matter, process, process act(s) or step(s) to the objective(s), spirit or scope of the present invention.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail).

Described herein is a modular robotic kitchen system.

OVERVIEW

Figure 1:
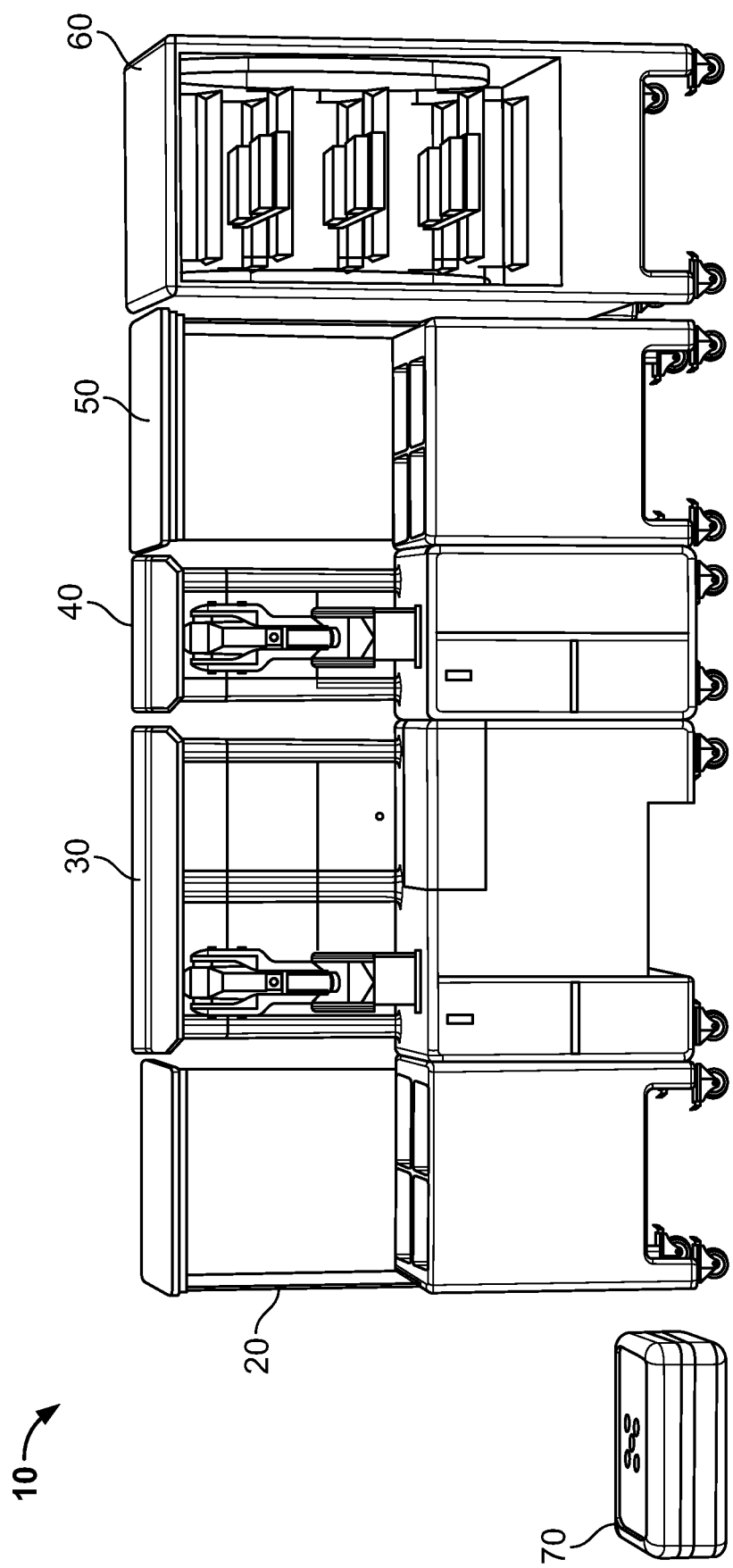
FIG. 1 is a modular robotic kitchen system comprising a plurality of modular carts in accordance with an embodiment of the invention.

FIG. 1 shows a cooking system 10 in accordance with an embodiment of the present invention. The cooking system 10 shows a plurality of modular units including an unpacking or ingredient unit 20, robotic kitchen assistant unit 30, robotic extension unit 40, packing unit 50, and warming or pick-up unit 60, each of which is discussed herein. Each of the modular units are shown including a shielded workspace, a cart, and wheels to facilitate locating and relocating each of the carts.

Also shown in FIG. 1 is an optional transport robot 70 to assist moving the modular units and to transport food and supplies between the modular units. See also mobile transport 910 in FIG. 20 positioning a modular cart 920 adjacent a main robotic arm module 930. An exemplary sled for use in the subject invention is described in U.S. patent application Ser. No. 16/281,088, filed Feb. 20, 2019, and entitled "ROBOTIC SLED-ENHANCED FOOD PREPARATION SYSTEM AND RELATED METHODS."

RKA Module/Unit

The robotic kitchen assistant (RKA) module 30 is shown including a shielded workspace, counter-top or bin area, a robotic arm having a plurality of degrees of freedom (preferably, 6 DOF), at least one sensor or camera, and a computer operable to control the motion of the robotic arm to carry out food preparation steps as discussed further herein. Examples of an RKA and robotic arm suitable are described in U.S. patent application Ser. No. 16/490,534, filed Aug. 31, 2019, entitled "ROBOTIC KITCHEN ASSISTANT FOR PREPARING FOOD ITEMS IN A COMMERCIAL KITCHEN AND RELATED METHODS" and U.S. Patent Publication No. 20180345485, filed Aug. 10, 2018, and entitled "MULTI-SENSOR ARRAY INCLUDING AN IR CAMERA AS PART OF AN AUTOMATED KITCHEN ASSISTANT SYSTEM FOR RECOGNIZING AND PREPARING FOOD AND RELATED METHODS."

Unpacking/Ingredient Module

The unpacking or ingredient cart 20 is shown including a shielded workspace, and four separate areas for holding ingredients or bins of ingredients. As discussed further herein, in embodiments, the ingredient cart 20 can hold multiple food items (up to 10), is robot friendly; includes face protection, and a lid or cover to close. Optionally, one or more of the separate areas are refrigerated. Additionally, in embodiments, discussed further herein, the system employs raw food packaging facilitating robot actions. By 'food items', it is meant to include a wide variety of types of food items whether cooked or uncooked.

Cooking Appliances

Figure 2:
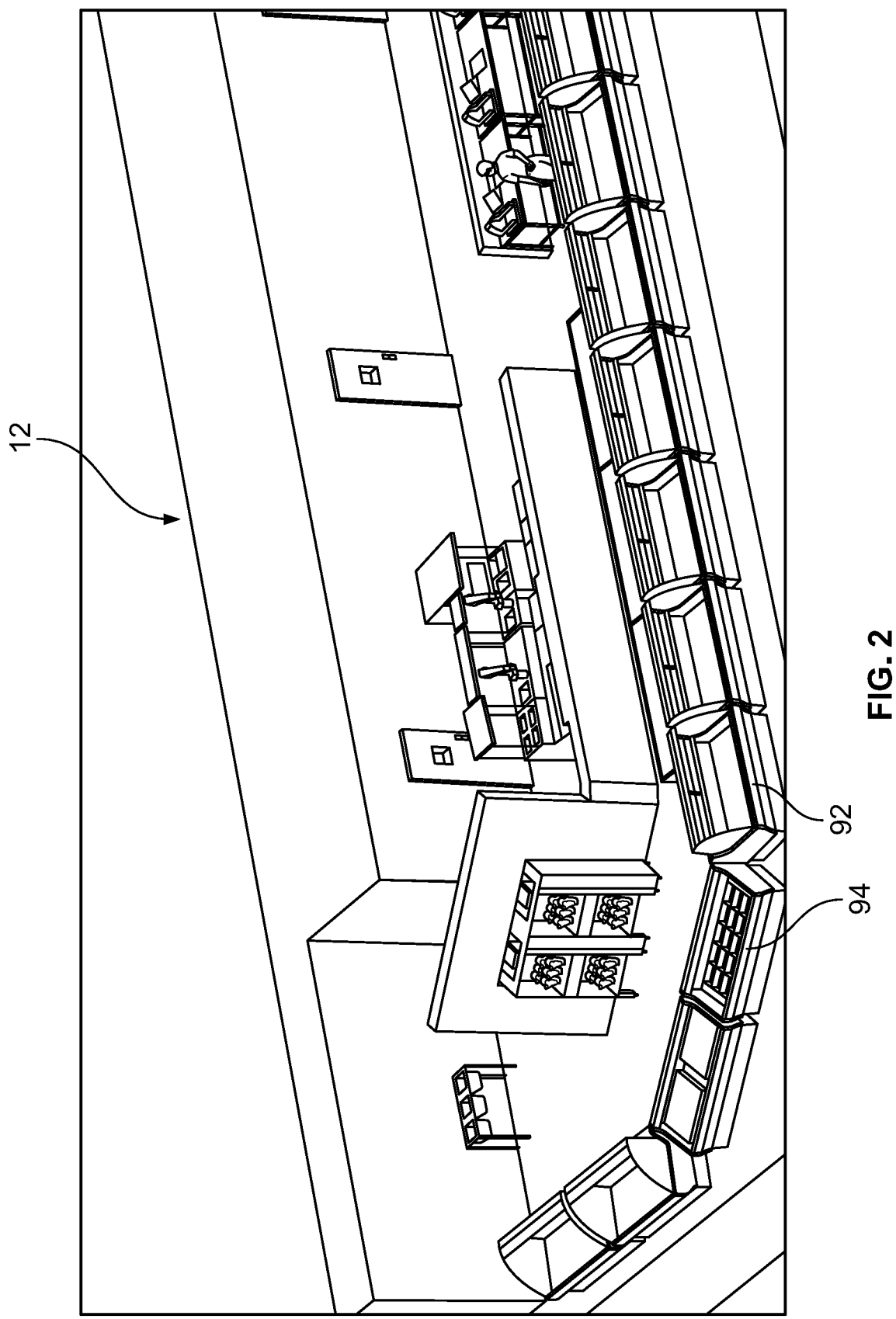
FIGS. 2-4 show various views of another modular robotic kitchen system arranged in a commercial kitchen environment in accordance with an embodiment of the invention.
Figure 3:
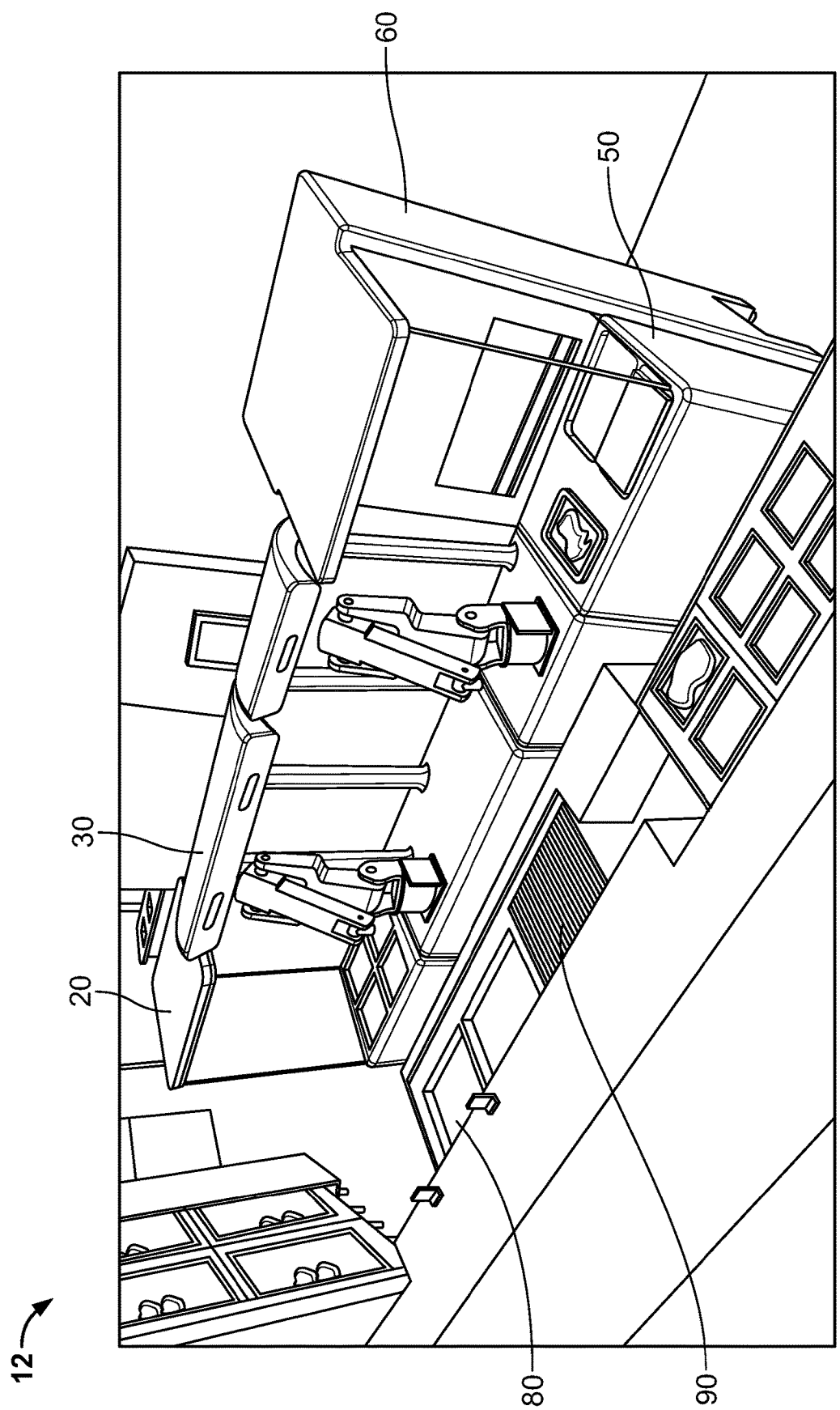
Figure 4:
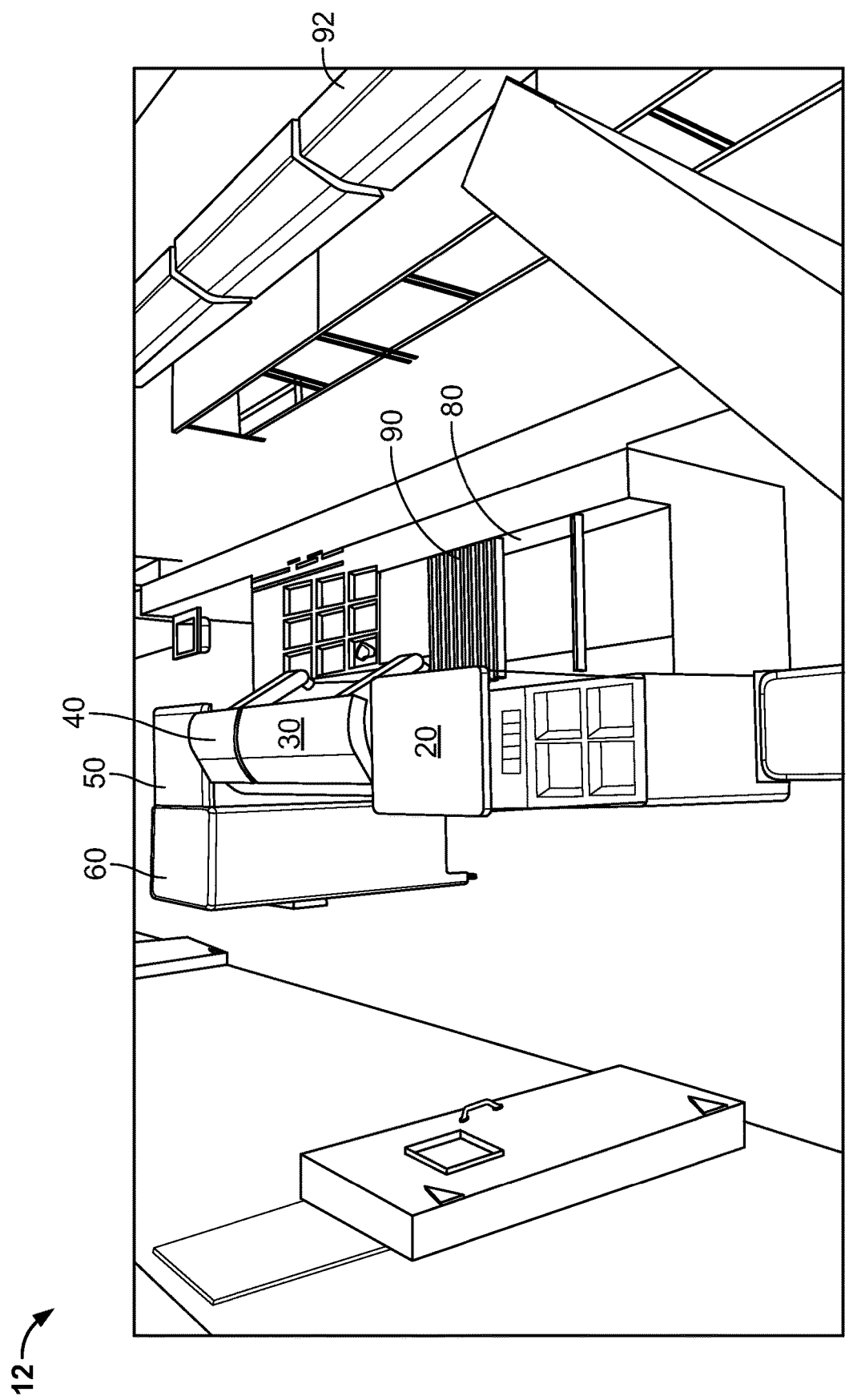

The modular robotic kitchen system can operate with a wide range of cooking appliances (e.g. fryer 80, grill 90) as shown in FIGS. 2-4, and as discussed further herein. The robotic arm(s) are operable to move food items to and from the applications to cook.

Preferably, in embodiments, temperature of the food items being cooked is monitored. The temperature can be input to scheduler engine, described further herein. Additionally, in embodiments, the temperature in the appliances (e.g., fryer oil, oven temperature, grill surface, etc.) can be monitored and automatically controlled, discussed further herein.

Additionally, in embodiments, the modular robotic kitchen system can include various utensils to facilitate transferring from one station or cart to another. In a particular embodiment, a fry basket is operable with the fryer and enables convenient and safe transfer of the fried items to another unit or workspace, discussed further herein.

Assembly & Packing Module

FIGS. 1-4 show an assembly and packing module 50. The packing module unit 50 is shown having a shielded workspace, counter and/or bins for supporting plates, dishes, bowls, or packing on which to serve or ship the completed entree. Packing may be carried out in various manners, discussed further herein.

Warming Module

FIGS. 1-4 show a warming module 60 for holding completed entrees. The warming module shown in FIG. 1 includes an enclosed space, temperature controlled, shelves optionally automatically movable to receive and present a completed entrée, and includes sensors to monitor temperature and confirm contents and inventor therein. Completed entrees may also be transported to the hot or cold cases 92, 94.

Extension Module

FIGS. 1-4 show an RKA extension module 40 to enhance, amongst other things, the reach, speed, and capability of the kitchen system. The RKA extension module is shown having a shielded workspace, small counter-top relative to the RKA cart 30, a robotic arm having a plurality of degrees of freedom (preferably, 6 DOF), at least one sensor or camera, and optionally a secondary computer operable to control the motion of the robotic arm. Optionally, a main computer controls the motion of both the main RKA cart and the extension module. Examples of an RKA and robotic arm suitable for the extension cart 40 are described in U.S. patent application Ser. No. 16/490,534, filed Aug. 31, 2019, entitled "ROBOTIC KITCHEN ASSISTANT FOR PREPARING FOOD ITEMS IN A COMMERCIAL KITCHEN AND RELATED METHODS" and U.S. Patent Publication No. 20180345485, filed Aug. 10, 2018, and entitled "MULTI-SENSOR ARRAY INCLUDING AN IR CAMERA AS PART OF AN AUTOMATED KITCHEN ASSISTANT SYSTEM FOR RECOGNIZING AND PREPARING FOOD AND RELATED METHODS."

System Architecture

Figure 5:
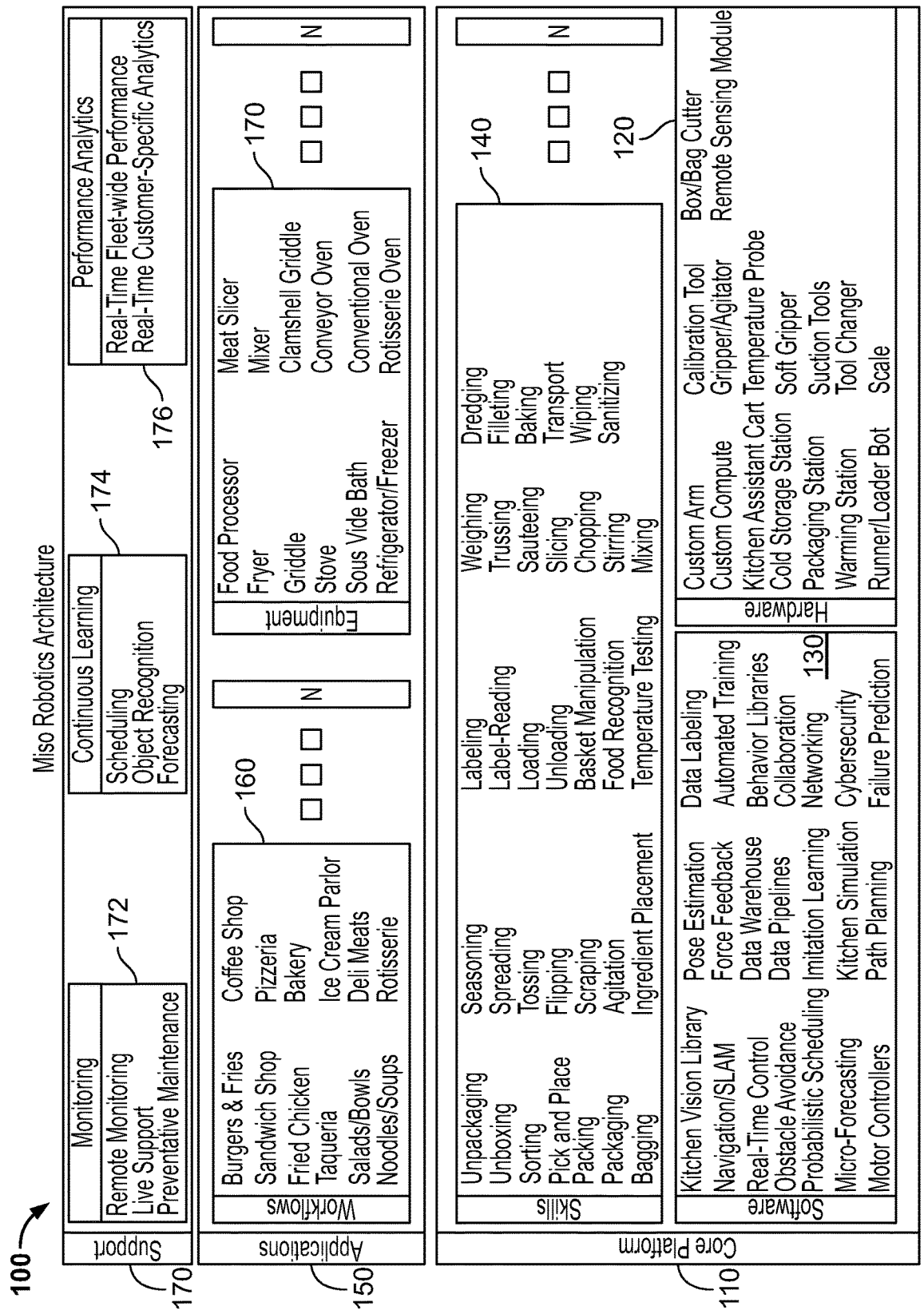
FIG. 5 is an illustration of a flexible system architecture of a robotic kitchen system, and optionally a modular robotic kitchen, in accordance with embodiments of the invention.

FIG. 5 is block diagram illustrating the system architecture 100 of a robotic kitchen system in accordance with an embodiment of the invention. With reference to FIG. 5, a core platform 110 includes hardware 120 and software 130.

Examples for use with embodiments of the inventions of hardware and software include, without limitation, central computer, servers, processors, memory and storage, commination interface, sensors, cameras, input devices such as keyboards or touchscreen displays, display. The processor is programmed or operable to execute various applications described herein as well as enable modules or engines for determining location and identification of food items, doneness, scheduling of steps, demand of food items, and inventory. Examples of food identification and location, scheduling, and demand modules as descried in U.S. patent application Ser. No. 16/490,534, filed Aug. 31, 2019, entitled "ROBOTIC KITCHEN ASSISTANT FOR PREPARING FOOD ITEMS IN A COMMERCIAL KITCHEN AND RELATED METHODS", U.S. patent application Ser. No. 16/490,775, filed Sep. 3, 2019, entitled "AUGMENTED REALITY-ENHANCED FOOD PREPARATION SYSTEM AND RELATED METHODS", and U.S. Patent Publication No. 20180345485, filed Aug. 10, 2018, and entitled "MULTI-SENSOR ARRAY INCLUDING AN IR CAMERA AS PART OF AN AUTOMATED KITCHEN ASSISTANT SYSTEM FOR RECOGNIZING AND PREPARING FOOD AND RELATED METHODS", each of which is incorporated by reference in its entirety for all purposes.

Core platform additionally shows skills 140 that are enabled by the hardware and software. Collectively, the core platform is highly flexible and adaptable to perform a wide range of cooking applications 150 which may include specific cooking workflows 160 and use of specific cooking equipment 170 such as a burger workflow and use of a griddle, respectively. The core platform 110, as described further herein, is readily adaptable to run a specific cooking workflow and use the provided equipment without needing to be reworked or rewired.

In embodiments, a new cooking workflow software is downloaded to the central computer for execution. Optionally, trained models may be downloaded to the central computer or the system trains itself based on machine learning algorithms.

FIG. 5 also shows a support layer 170 including monitoring 172, continuous learning 174 and performance analytics 176.

The monitoring system 172 is operable to continuously track the status of the system and flags anomalous behavior to be corrected by local or remote staff.

The continuous learning system 174 is operable to utilize these flagged issues to retrain the neural networks in order to improve the performance of the autonomous system for food classification.

A performance analytic system 176 is operable to aggregate at regular intervals to improve store management and give guidance on where to focus efforts. The analytics serve to determine the difference between the amount of food cooked compared to the amount of food ordered, to produce food safety and quality reports, and to report on the status of the machine and when the next maintenance cycle is due.

Unpacking & Raw Food Packaging

In embodiments, a method for packing, transporting, and unpacking raw food for preparation in kitchens includes providing custom containers designed for ergonomic access by humans and manipulation by mechanized systems.

Preferably, the raw packing system is in a centrally located distribution warehouse and is operable to quickly unpack and repack the modular carts. Additionally, the contents in each cart is tracked throughout the time the contents are in the cart using an automated tracking system.

The raw packing system can include various hardware such as a battery and power management system, a charging interface to supply power to the battery and power management system in the cart, and a wired and/or wireless communication system to maintain in-transit tracking of the cart and also to communicate with the robotic kitchen assistant modular unit, described herein.

In embodiments, an access control system is provided with the cart and operable to obtain a return merchandise authorization (RMA) and to allow the contents in the cart to be returned safely back to the distribution warehouse and repacked for a different store, without risking store-to-store contamination.

The packing and unpacking system can optionally log environmental data of the cart at all times.

The packing and unpacking system may include an environmental control system to control the temperature and other environmental conditions within he warehouse or kitchen. For example, in embodiments, the environmental control system comprises a compressor-based bidirectional heat pump, and optionally the heat pump may be a solid state heat pump using, e.g., Peltier junctions.

In embodiments, the environmental control system comprises a passive thermal reservoir utilizing ice or other similar latent heat of phase change and heavy insulation. In embodiments, a combination of the above thermal control systems are used in combination.

In embodiments, the raw food is packaged in a thermal insulative container. In particular embodiments, raw food is packaged in pillow packs that are hermetically sealed via plastic welding. The pillow pack is opened via a blade or a perforation in the packaging material, and the contents can then be dumped into cooking container, e.g. fryer basket or pot. The packaging material is then discarded.

In embodiments, the pillow pack container implementation can be grabbed with a suction cup.

In embodiments, the pillow pack container can be grabbed with a molded gripping feature designed for a custom end effector to enhance manipulability of pillow pack.

In embodiments, small reusable rigid containers are used to contain food product. Preferably, in embodiments, a freezer safe package can be opened without the use of a knife by pulling apart the bag.

Figure 11:
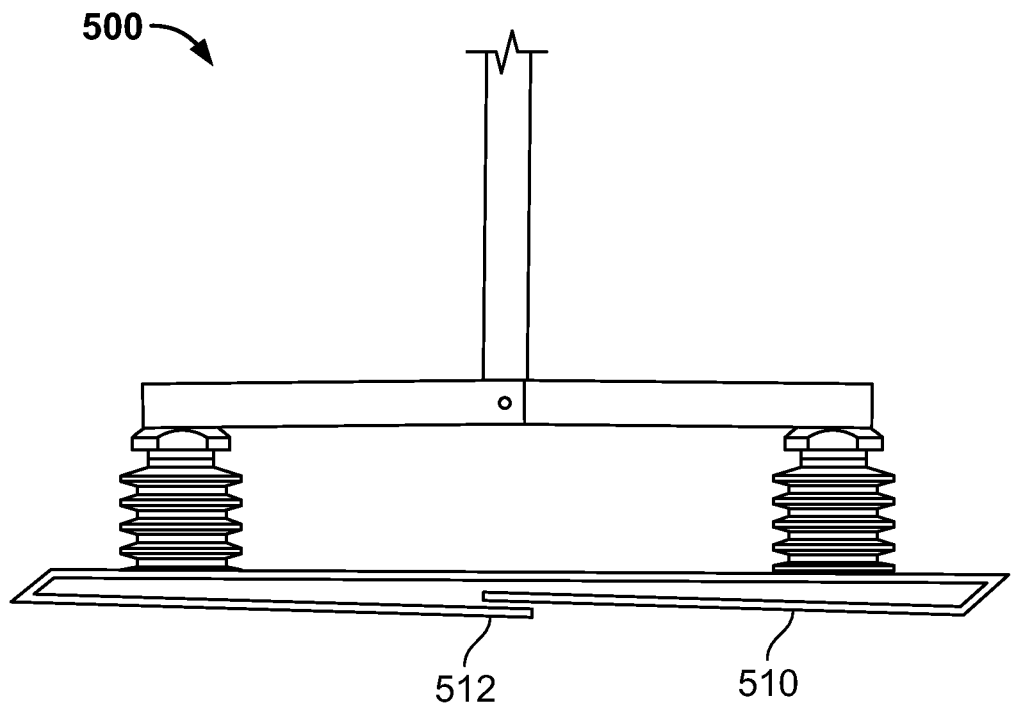
FIG. 11 shows a design of a robot-friendly freezer package with overlapping seams and gripper system in accordance with an embodiment of the present invention.
Figure 12:
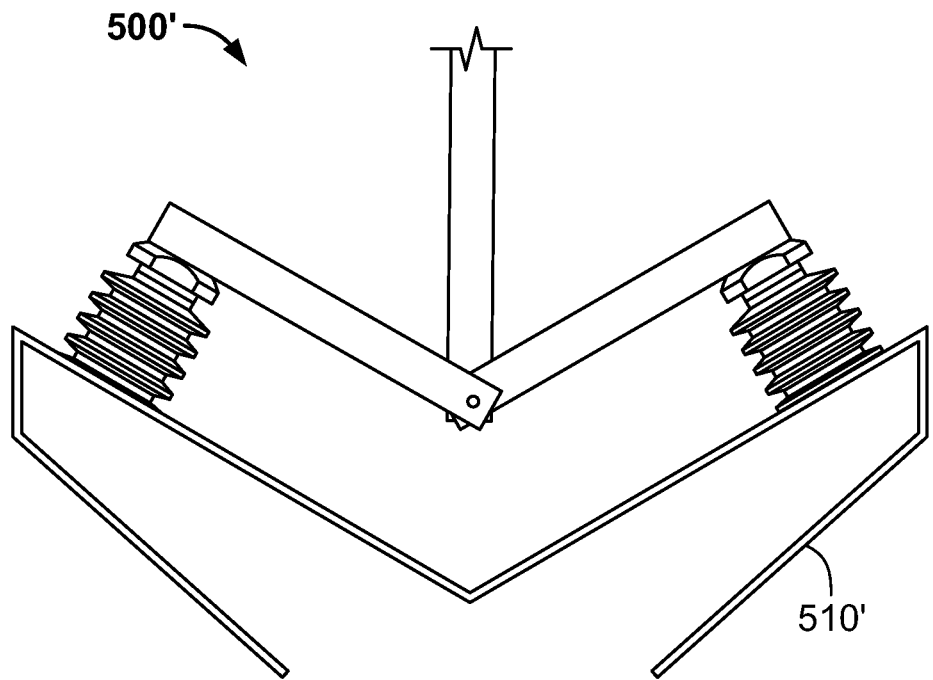
FIG. 12 shows a design of a robot-friendly freezer package opened by gripper system in accordance with an embodiment of the present invention.

With reference to FIGS. 11-12, in embodiments, a freezer-safe package 510, 510' that can be easily opened by a mechanized system 500, 500' by folding the packaging in half. FIG. 11 shows the design of a robot-friendly freezer package 510 with overlapping seams 512 and gripper system 500 in accordance with an embodiment of the present invention. FIG. 12 shows the design of the robot-friendly freezer package 510' opened by gripper system 500' in accordance with an embodiment of the present invention.

In embodiments, the freezer safe package encodes information about the product.

In embodiments, a freezer safe package is adapted to dissolve in hot oil to release contents into the oil to cook. Exemplary materials for the freezer safe bag include rice paper, starch, etc.

Temperature Testing

In embodiments, a robotic assisted method for determining the temperature of food being cooked (e.g., batch of fried foods) comprises singulating the pieces of cooked food from a batch, ranking the pieces according to size, and testing the internal temperature of the largest pieces to guarantee food safety requirements.

Figure 6:
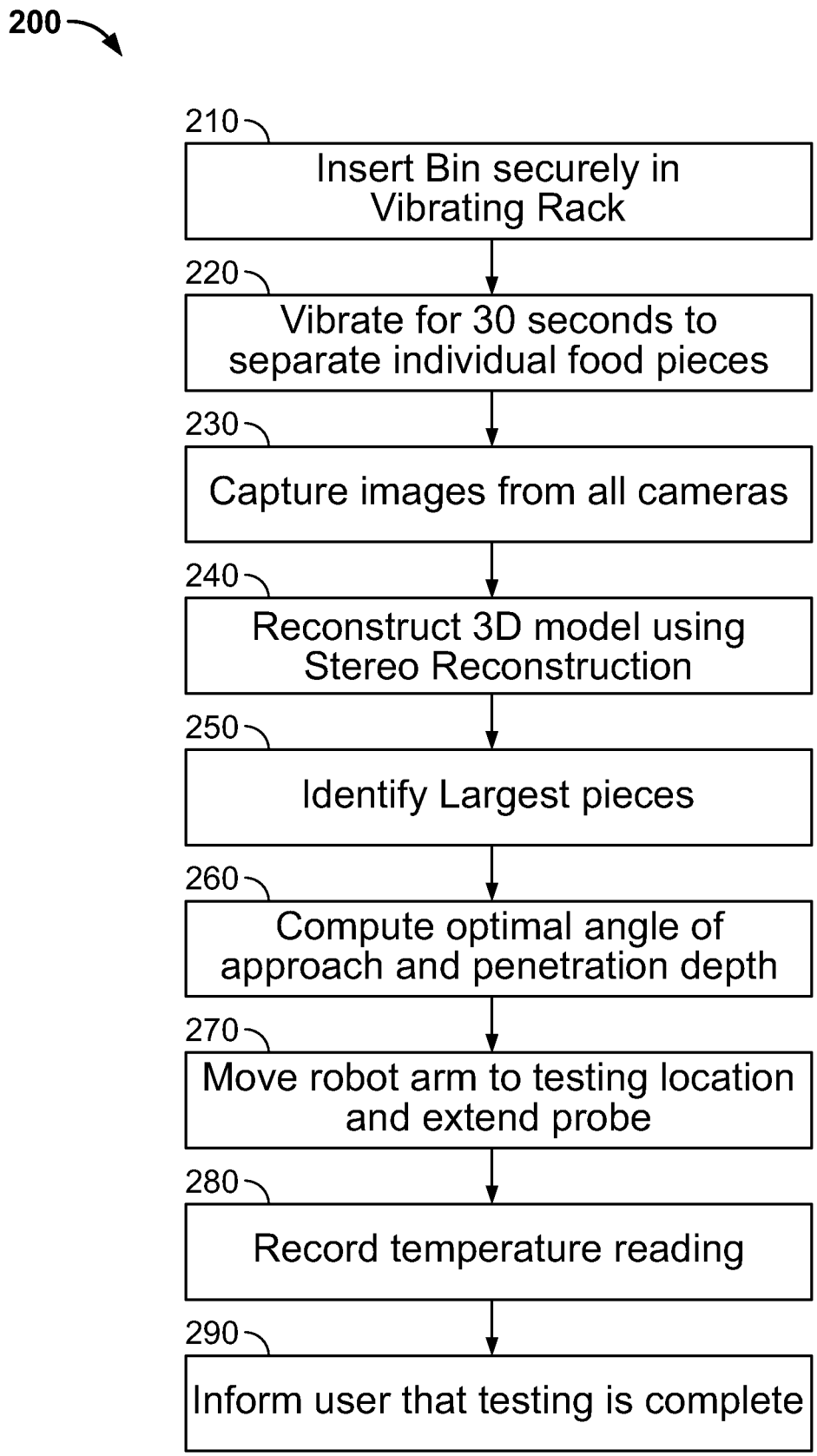
FIG. 6 is a flow diagram for a robotic temperature testing system in accordance with an embodiment of the invention.

FIG. 6 is a flowchart of a method 200 in accordance with an embodiment of the invention to test temperature of food items during cooking.

Figure 7B:
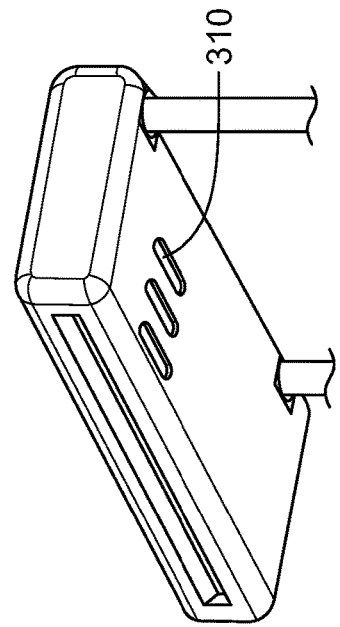
FIGS. 7A-7C show an example configuration of camera positions and orientations for a robotic temperature testing system in accordance with an embodiment of the invention.
Figure 7C:
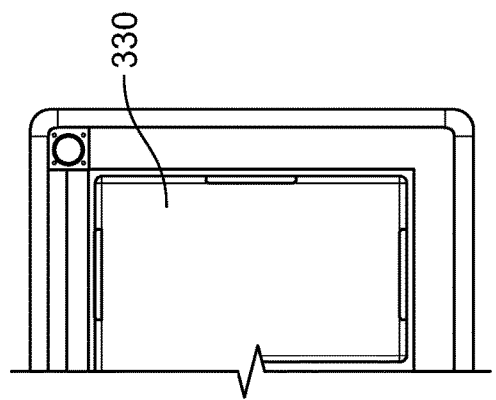
Figure 7A:
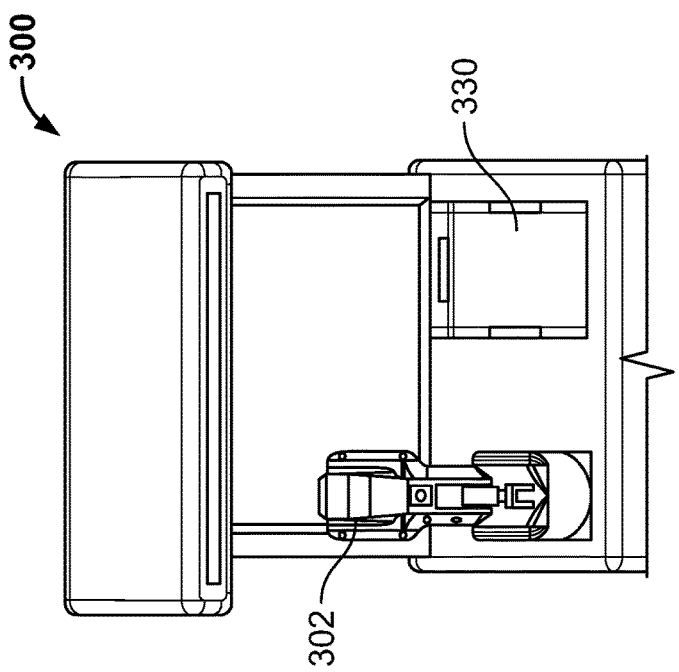

Step 210 states to insert a bin of the food items in a vibrating rack. With reference to FIGS. 7A-7C, a cart including a bin 330 is shown. The bin 330 may be placed in the rack using the robotic arm 302.

Figure 8:
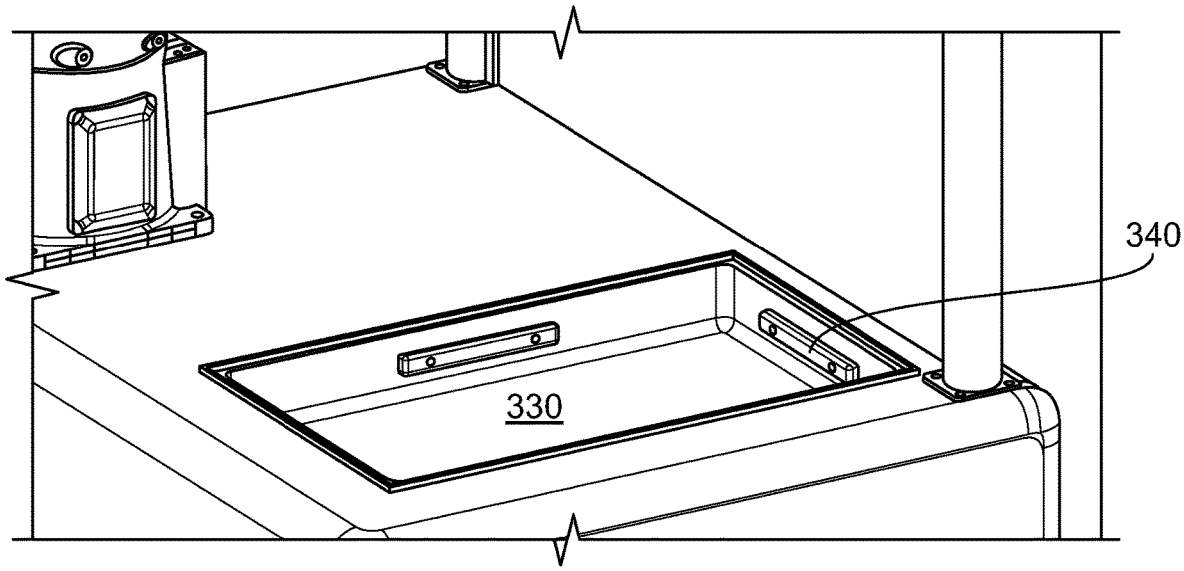
FIG. 8 shows a vibrating rack mechanism which allows a bin to be agitated easily in accordance with an embodiment of the present invention.
Figure 9:
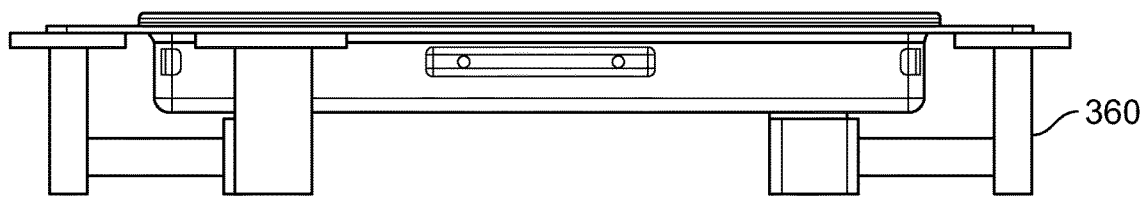
FIG. 9 shows a bin resting securely in the vibrating rack shown in FIG. 8 in accordance with an embodiment of the present invention.

An example of a vibrating rack mechanism which allows a bin to be agitated easily is shown in FIGS. 8-9. Particularly, FIG. 9 shows the Bin 330 positioned securely in the vibrating rack 360. The vibrating rack 360 is designed to hold a bin and agitate it. This causes ingredients to spread out on the bottom of the bin, thereby singulating individual pieces. Preferably the system has a vibrating rack which can hold a standard size bin. A standard size bin ranges from 3 inches by 6 inches to 12 inches by 20 inches.

The bin shown in FIG. 8 also includes a camera 340, serving to see/detect the contents within the bin, discussed further herein.

Step 220 states to vibrate for 30 seconds, or until the foods items are separated from one another. Steps 210 and 220 collectively serve to singulate the food items.

Step 230 states to capture images of the food items from a plurality of cameras. FIGS. 7A-7C show an example configuration of camera positions and orientations 310. Additionally, in embodiments, the robot arm has a camera on its wrist, or another portion of the robot arm. The data from this robot arm-carried camera can be combined with the data from other cameras to improve accuracy by filling in sensing gaps.

Examples of the sensors include, without limitation, cameras (optical and/or IR) and Time-of-Flight sensors (depth measurements). The array of cameras 310 serves to provide enough information to estimate volume from reconstructed 3D models, discussed further herein. Additionally, the bin can be made of highly transparent material to allow vision from the bottom.

Step 240 states to reconstruct the 3D model of the food items. The robotic temperature testing system performs this analysis using the array of cameras and performing a technique called stereo reconstruction as described in, for example, Ju Yong Chang, Haesol Park, In Kyu Park, Kyoung Mu Lee, Sang Uk Lee, GPU-friendly multi-view stereo reconstruction using surfel representation and graph cuts, Computer Vision and Image Understanding, Volume 115, Issue 5, 2011, Pages 620-634. In embodiments, the images from the plurality of cameras are fused together using Stereo Reconstruction to obtain a 3D scan of the bins and the objects therein.

In embodiments, segmentation is achieved using a neural network as in Kaiming He, Georgia Gkioxari, Piotr Dollár, and Ross B. Girshick, Mask R-CNN, arXiv, 2017. Analyzing the segmentation can determine whether the food items have been fully singulated as well as provide a list of objects of interest.

Step 250 states to identify the largest pieces. In embodiments, for each piece of food, the system performs a volumetric analysis. Particularly, the segmented pieces are analyzed to see which are the largest with select geometric calculations to find the largest part of a piece of food. The pieces can be ranked according thickness of the thickest part. One or more of the thickest pieces are then selected for temperature testing, discussed below.

Step 260 states to compute the optimal angle of approach and penetration depth for the temperature probe discussed further herein. This approach and penetration step is calculated based on the information, size and orientation determined from the above steps. In embodiments, it is desirable to aim towards the center of mass of the food item, and of the largest food item.

In order to test a given piece of food properly, an appropriate angle of approach and penetration depth must be selected. For homogeneous items (such as a piece of boneless chicken breast), it is sufficient to locate the largest cross-sectional area and penetrate orthogonally to the surface and up to the middle of the food item.

For items that do not have reasonably homogeneous heat capacity, such as a bone-in chicken breast, it is not sufficient to simple insert into the largest cross section area. For the example of bone-in chicken breast, it's important to these the thickest piece but avoid the bone since it heats much faster than the surrounding tissue. Therefore, a model is necessary to infer optimal angle of approach and penetration depth.

Learning a model for angle of approach and penetration depth can be accomplished either through heuristic approaches or using machine learning. With either approach, the goal is to build a model to estimate the pose and parameters of a food item. Using this model, some embodiments use heuristics to specify how to approach and penetrate.

In embodiments, a heuristic model is sometimes used, such as located the largest cross-sectional area and penetrating orthogonal to that. This type of method can work well on a variety of food items. But some food items require more complicated techniques.

Other embodiments use learning by demonstration to build a model for angle of approach and penetration. In embodiments, a thermal probe that publishes its pose in space is used by a human trainer. The human trainer goes through the motions and the pose of the thermal probe is tracked over time as the human trainer tests many pieces of a type of food item. Using these data, a model can be trained that will allow computation of the optimal angle of approach and penetration depth.

These models for computing optimal angle of approach and penetration depth are generated using shared data via the Internet. This allows multiple robotic temperature testing systems to learn more quickly.

Step 270 states to move and insert the probe. In embodiments, temperature testing is performed with a temperature testing tool 400 and probe 420 attached to the end of a robot arm 302. This robot arm 302 can have 4, 5, 6, 7, or a higher number of degrees of freedom. The robot arm can also take other configurations including but not limited to that of a SCARA arm or a delta arm.

In the embodiment shown in FIGS. 10A, 10B, a thermal probe 420 on the temperature testing tool 400 can be retracted and extended.

FIG. 10A a side view of the temperature testing tool 400 in the extended position in accordance with an embodiment of the present invention is shown. It can be seen that the probe tip 410 extends beyond the flange 420 to allow for insertion into food items.

FIG. 10B shows the temperature testing tool of FIG. 10A in the retracted position. It can be seen that the probe tip retracts beyond the flange 430 to create separation from food items. The flange 430 makes contact with the food to allow the probe to be retracted easily. The flange facilitates separating the tested food item from the probe.

The extension may be performed by various mechanisms such as, e.g., a loaded spring 440, a pneumatic actuator, or an electromagnetic actuator such as a motor. Retraction can be accomplished with a pneumatic actuator or an electromagnetic actuator. Preferably, the extension action is performed using a sufficiently fast actuator to cause the extending probe to quickly penetrate food. By moving quickly enough, the probe is able to avoid static friction altogether and operate with kinetic friction which allows for less friction overall. This mitigates undesired motion of the food item being tested that would otherwise occur during insertion of the thermal probe The probe may be made of various materials including, e.g., stainless steel or another food-safe material with appropriate thermal properties that can be inserted into a variety of cooked foods including but not limited to bone-in chicken, chicken tenders, and chicken nuggets, hen/turkey parts, boneless chicken/turkey pieces, steaks, hamburgers, fillets, tenders, cutlets, potato wedges, etc.

In embodiments, the thermal probe has axial force sensing. This force sensing provides feedback if the probe makes contact with a bone in a piece of meat or if a probe makes contact with any other impenetrable components in a piece of food. In spring-loaded embodiments of the thermal probe, the force can be sensed by measuring the displacement of the probe from full extensions and applying Hooke's Law. In electromagnetic embodiments, current and dynamics can be measured and compared against a model of expected current.

Step 280 states to record the temperature reading.

Step 290 states to inform user testing is complete.

Additionally, in embodiments of the invention, a sanitation is performed when a piece of food is measured to be below the food-safe temperature threshold. The sanitation step may be performed variously. In one embodiment, the probe is sanitized with an attached sanitation bath. The sanitation bath uses approved chemicals to sanitize the thermal probe and flange.

Equipment Temperature Integration with Robotic System

The modular kitchen systems described herein may also monitor and control temperature of the appliances (e.g., a fryer or oven) during operation.

In one embodiment, a method for controlling kitchen equipment temperature includes selecting the optimal input at present time while optimizing for a time horizon based off of future thermal load prediction and oil life preservation goals.

Oil life preservation may be performed, for example, by dropping the temperature of kitchen equipment such as a fryer to extend the lifetime of consumables such as fryer oil during periods when equipment is not in use, as determined by a kitchen production forecasting system.

Additionally, the present invention includes preemptively changing thermal input into the kitchen equipment before a thermal load is applied. For example, fryer gas burner can be turned on 20 seconds before a basket of frozen fries is dropped into fryer.

Preferably, control of the equipment is automated. In embodiments, a controller utilizes a camera or sensors to track workers in the kitchen to predict when food will be added to system. The controller raises or lowers the temperature of the appliance automatically based on the location and movement of the workers.

In embodiments, the controller is connected to a production forecasting system based on various inputs. Examples of input to the production forecasting system include, without limitation: prior demand, point-of-sale data, and product stock levels.

In embodiments, the controller is connected to a robotic kitchen assistant which relays its cooking cadence over to controller for predictive temperature control.

In embodiments, the computer monitors the health of the kitchen equipment by observing effect of heat input on temperature readouts when equipment has no thermal load.

In embodiments, the robot is operable to skim contents out of the fryer to preserve the lifetime of the equipment and the oil.

In embodiments, the system determines optimum lifetime of the oil, and when the oil needs to be changed based on tracking the throughput of food cooked in the fryer.

Robotic Food Packing System

Figure 13:
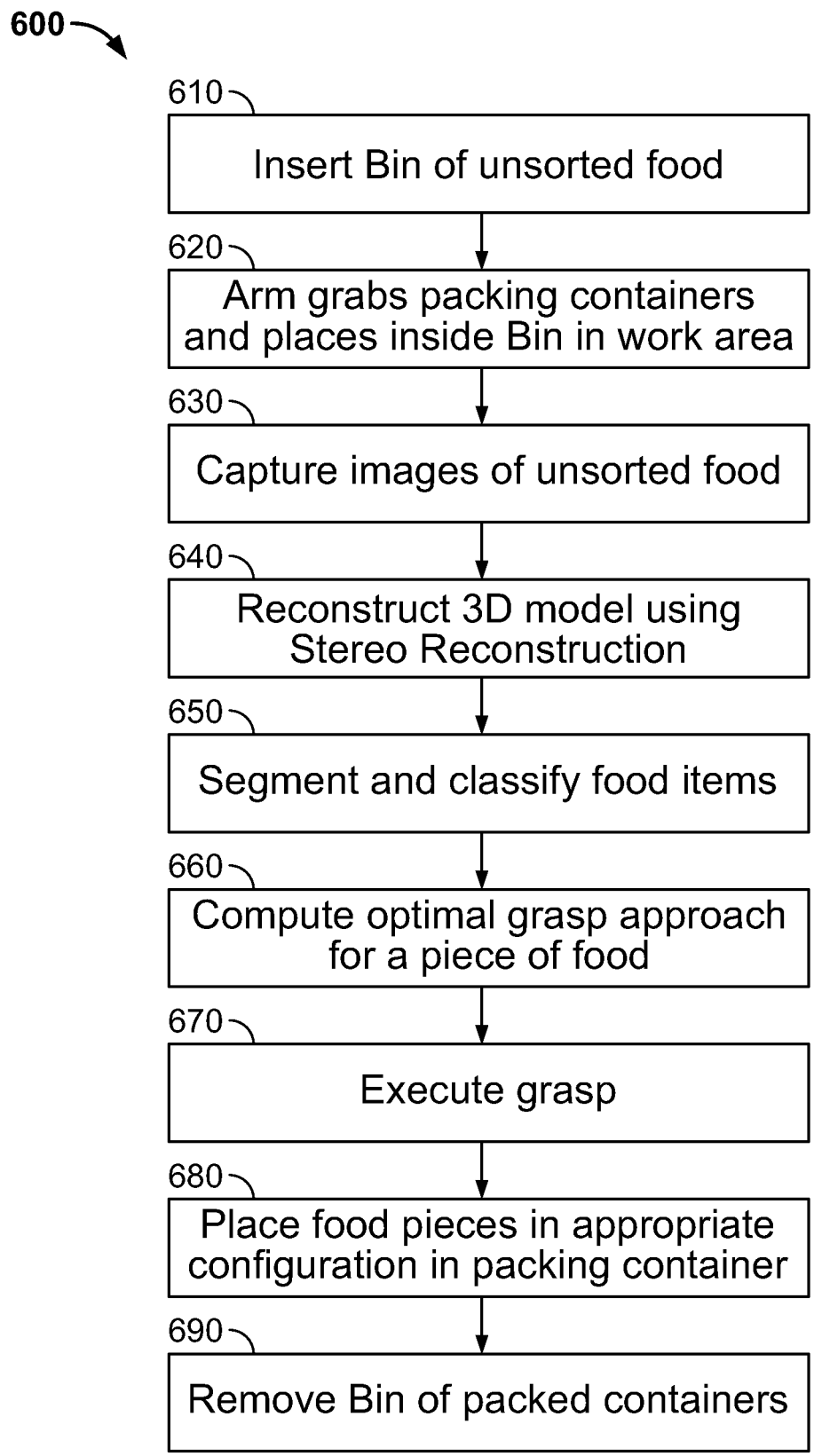
FIG. 13 is a flow chart illustrating an operational procedure for packing a food container in accordance with an embodiment of the invention.

FIG. 13 shows an operational procedure 600 for packing a food container. For facilitating understanding of the invention, the procedure set forth in FIG. 13 will be discussed with reference to the apparatus shown in FIGS. 14-15B.

Figure 14:
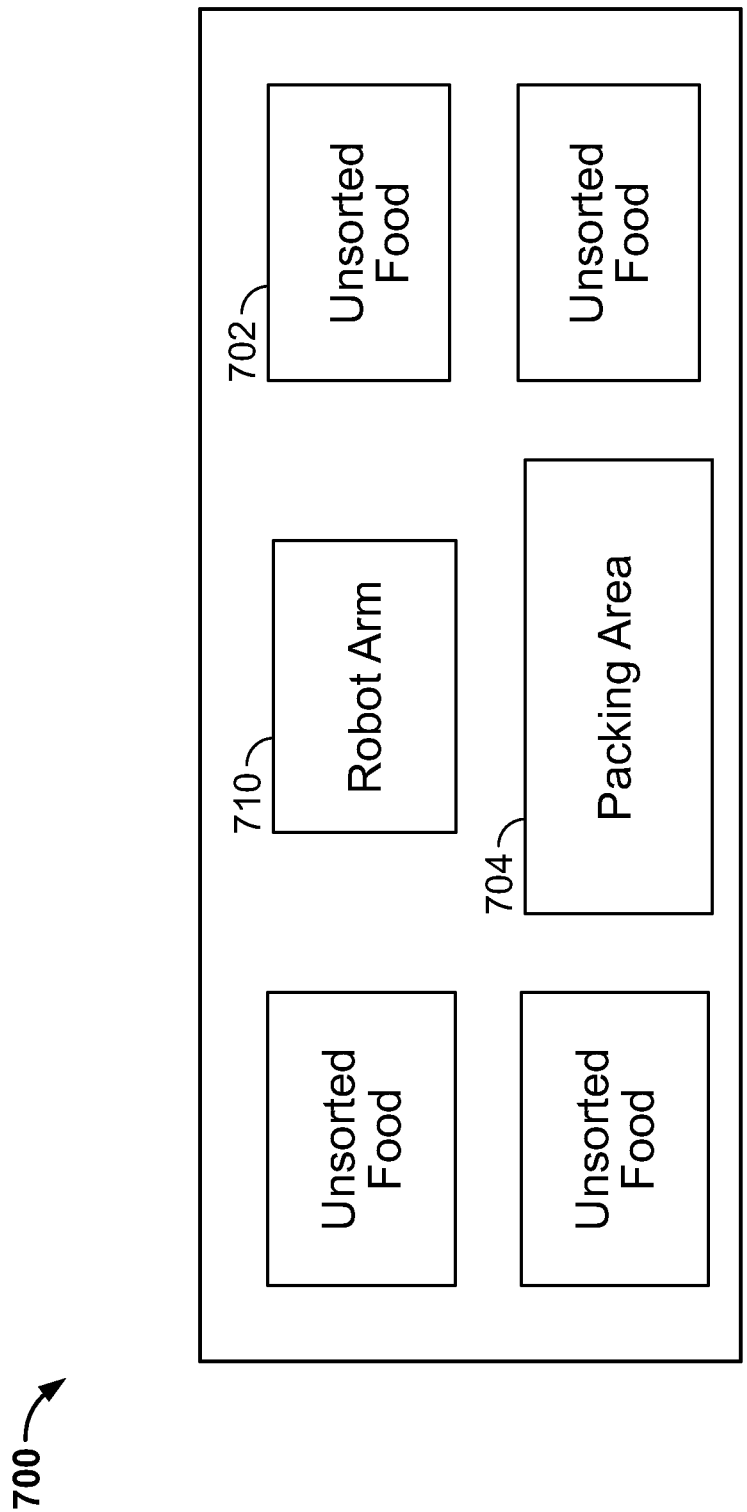
FIG. 14 shows an overhead view of a robotic food packing system in accordance with an embodiment of the invention where the unsorted food boxes represent locations where bins of unsorted food are placed and the packing area is a work area where packing containers can be placed while they are being packed.
Figure 15A:
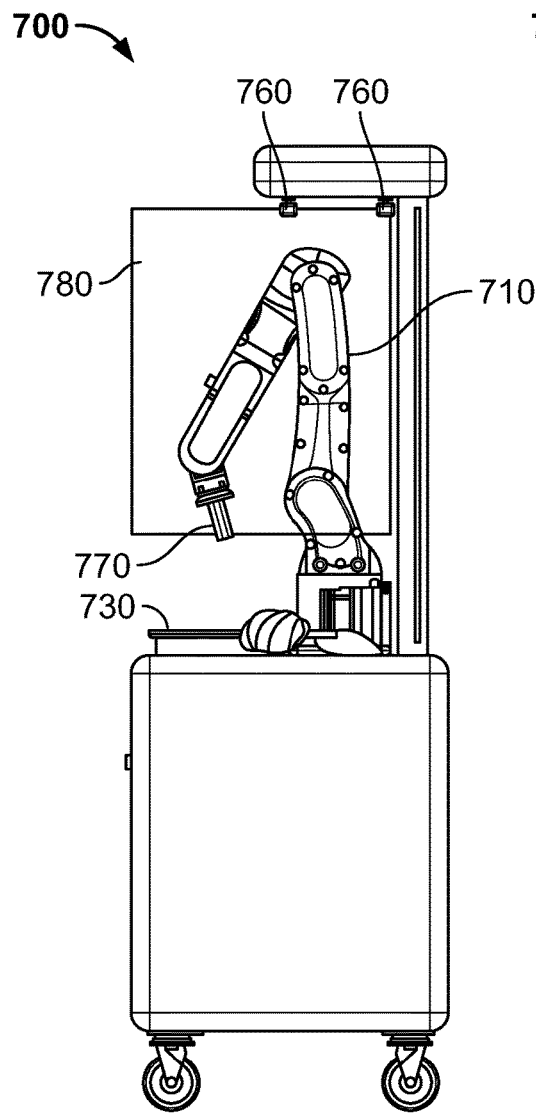
FIGS. 15A and 15B are a side and front views, respectively, of a robotic food packing system in accordance with an embodiment of the invention.
Figure 15B:
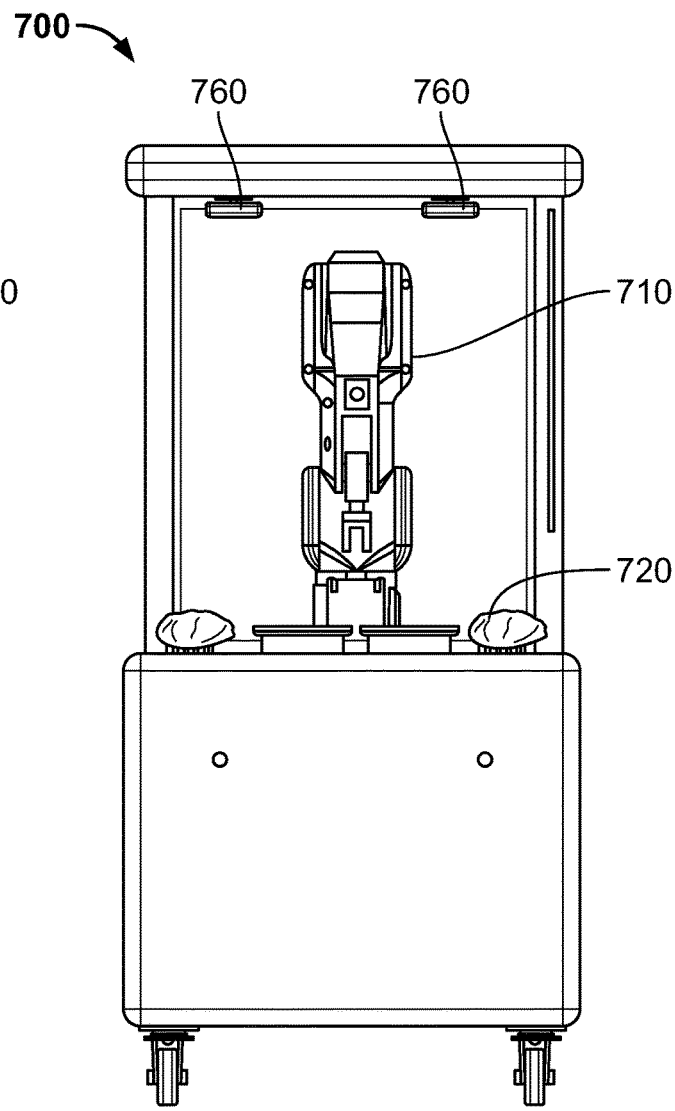

Step 610 states to insert bin of unsorted food. With reference to FIGS. 14-15B, one or more bins of unsorted food 720 are placed in the unsorted food area 702 within the workspace of the modular packing cart 700. The unsorted work areas 702, and bines of unsorted food 720 are within arm's reach of the robotic arm 710. Optionally, the system interfaces with either a human kitchen worker or another robotic kitchen assistant to place the bins or unsorted food in the unsorted food area 720.

Step 620 states to place at least one packing container 730 inside packing area 704. In embodiments, one bin sits in the work area to be used for packing. Another bin sits in the work area and contains packing containers. However, the number of the bins and areas may vary.

Step 630 states to capture images of the unsorted food. The cameras or sensors 760, described herein, can be arranged above the worksurface and food items or elsewhere to aim at and obtain images from multiple angles of the unsorted food. With reference to FIG. 15B, the locations of the overhead cameras 760 in the camera array are placed above the worksurface. Placing cameras in these locations allows the system to perceive the contents of Bins with high accuracy.

Indeed, in order to properly portion and plate or pack a container, a Robotic Food Packing System can see in 3D the objects inside a bin of unsorted food. This 3D imaging data can then be used to drive decisions, discussed herein, on how and what to pick out of the bin of unsorted food. High fidelity 3D vision in a Robotic Food Packing System is achieved with an array of optical cameras mounted above the Working Surface of the Cart. These cameras point at the various work areas as in FIG. 14.

Step 640 states to reconstruct the 3D model. Preferably, as discussed above, stereo reconstruction is employed for this step.

Step 650 states to segment and classify the food items. This step may be carried out as described above.

Step 660 states to compute an optimal grasp approach for a piece of food. This step may be determined and carried out based on parameters of the end effector tool 770 and the robot arm 710, and the output from step 650.

Step 670 states to execute grasp.

Step 680 states to place food pieces in appropriate configuration in packing container 730. This step is executed by the robotic arm, and based on order information. In embodiments, pick and place is achieved using computer vision. Images are captured by video cameras and processed by convolutional neural networks. Such a network involves a series of convolutional layers and max pool layers as well as other layers. These neural networks can be trained to infer the optimal angle of approach and determine the path necessary to successfully pick up an object.

Step 690 states to remove bin of packed containers. Optionally, similar to step 610, the system is operable to interface with either a human kitchen worker or another robotic kitchen assistant to remove the bin of packed food containers from the packing area 730.

As mentioned herein, the workspace of the modular cart may be shielded to protect workers. In embodiments, and with reference to FIG. 15A, transparent windows 780 can be incorporated into the cart, rising from the waist-level work surface to prevent kitchen workers from interacting unsafely with the system.

Figure 16:
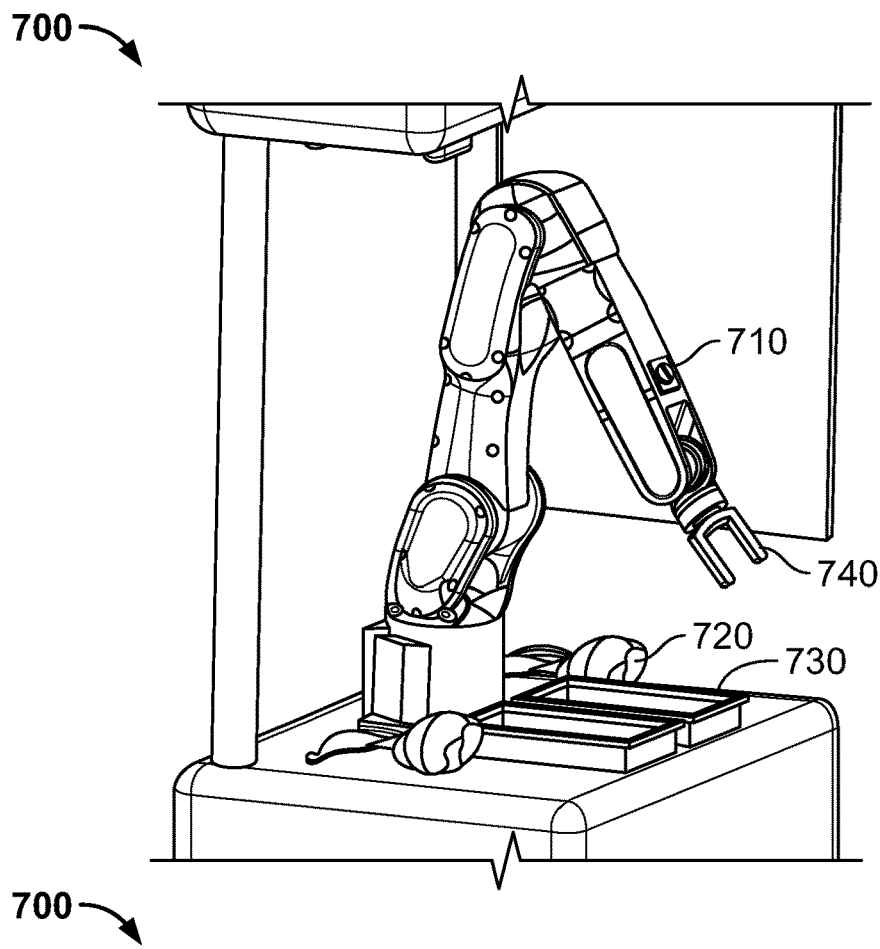
FIG. 16 shows a robotic arm with an opposable gripper capable of picking up a variety of food items in accordance with an embodiment of the invention.
Figure 17:
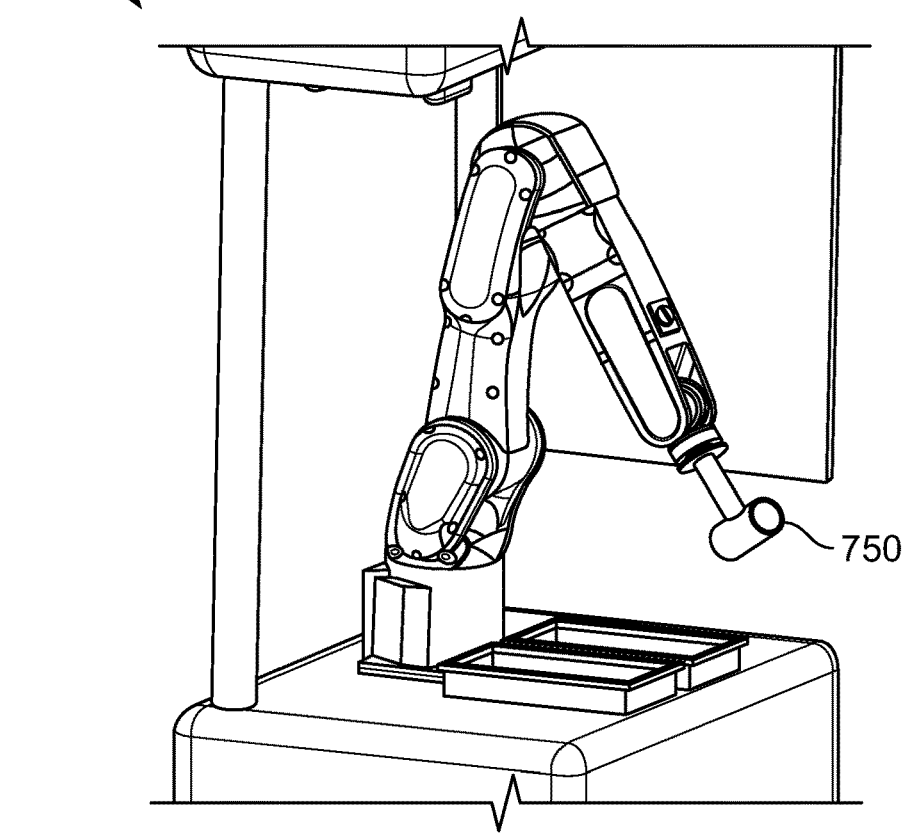
FIG. 17 shows a measuring tool that is capable of using a variety of measuring tools for liquid and powders in accordance with an embodiment of the invention.

In embodiments, various types of gripping, grasping, wedging, squeezing, clamping, scooping, ladling, skewering, and suctioning tools are used to pick up one or more pieces of food. With reference to FIG. 16, for example, the robotic arm 710 may be provided with an opposable gripper 740 capable of picking up a variety of food items. Alternatively, with reference to FIG. 17, the robotic arm may be provided with a measuring tool 750 that is capable of using a variety of measuring tools for liquid and powders.

In embodiments, sorting and packing is performed with a gripper tool attached to the end of a robot arm. The robot arm can have 4, 5, 6, 7, or more degrees of freedom. Additionally, the robot can have other configurations including but not limited to, a SCARA or delta-type robot.

In embodiments, the robot arm may have a camera on the wrist. The data from this camera can be combined with the data from other cameras to improve the accuracy of pick and place behaviors. In embodiments, the wrist imaging sensor may be RGB, IR, or depth, or some combination of these sensors.

In embodiments, a convolutional neural network is sometimes used to identify packing containers, either in a stack or set out in preparation for packing.

In embodiments, the decision on what and how to pack is driven by external data coming in via sensors and the Internet. Packing contents are determined by recipes.

In embodiments, learning by demonstration is sometimes used to build a model for picking up food items. A human expert goes through the motions of picking up many examples of a food item or various food items. These data can be used to train a model to pick up various food objects.

In embodiments, reinforcement learning (trial and error) is used. In this process, the system makes repeated attempts at picking up food objects. The system uses these attempts to refine the grasping model and eventually the system learns to grasp a variety of objects consistently.

In embodiments, learned models for grasping are shared amongst numerous robots potentially with a wide geographic distribution.

Smart Robotic Kitchen

As discussed herein, the modular robotic kitchen system includes modular carts, appliances, and transports operable to interact and communicate with one another to deliver and prepare food according to an optimal schedule and with limited waste.

Figure 20:
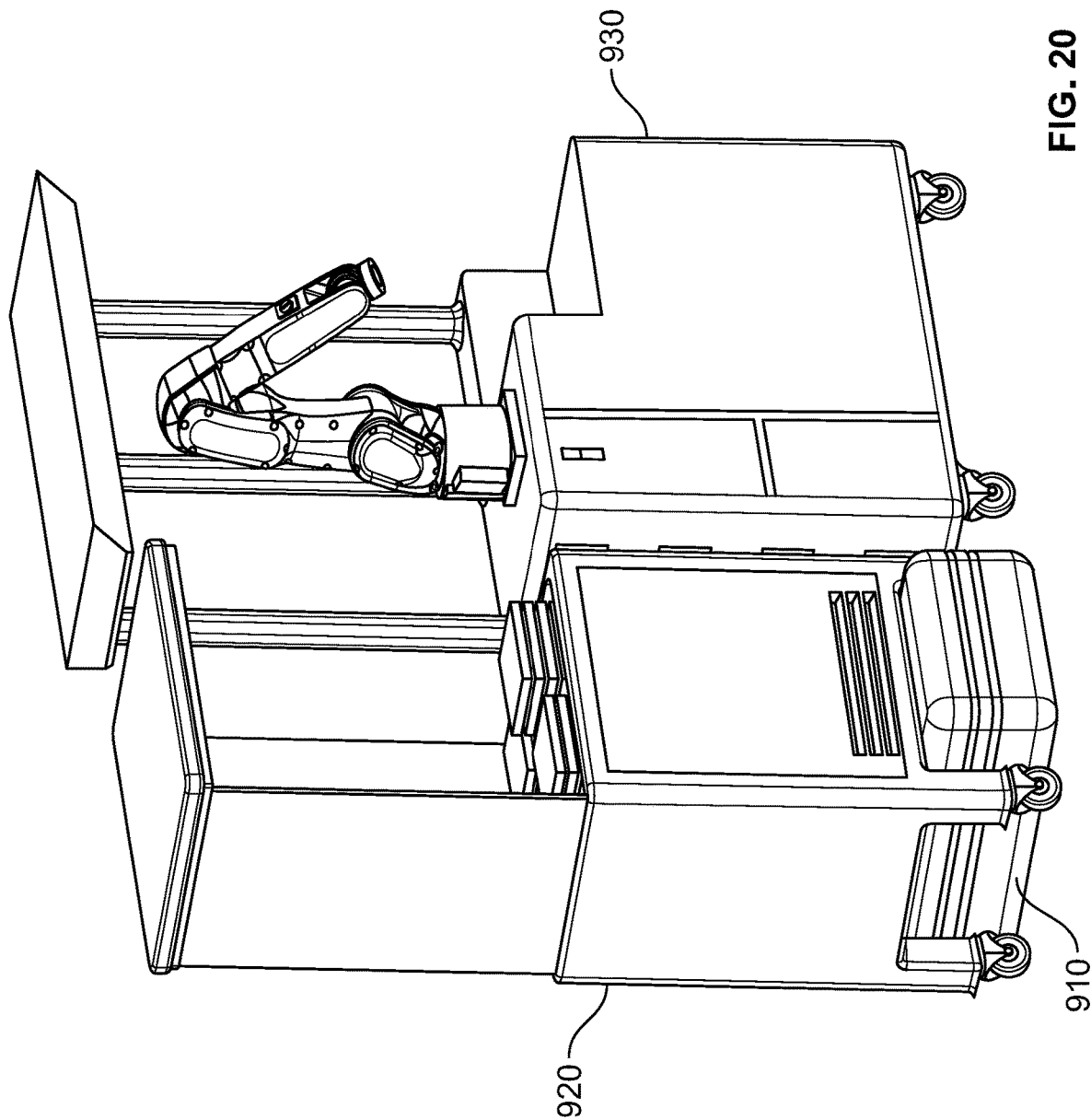
FIG. 20 shows a mobile robot transporting food between modular units in accordance with an embodiment of the invention.

With reference to FIG. 20, a mobile robot 910 is shown moving a supply cart 920 of food containers to robotic modular unit 930 in accordance with an embodiment of the invention. In this manner, food supplies can be provided automatically and without human interaction. Further, the robotic arm of module 930 is operable to pick up and distribute the supplies as determined by the scheduling engine discussed herein.

Food Quantity Sensors

Figure 21:
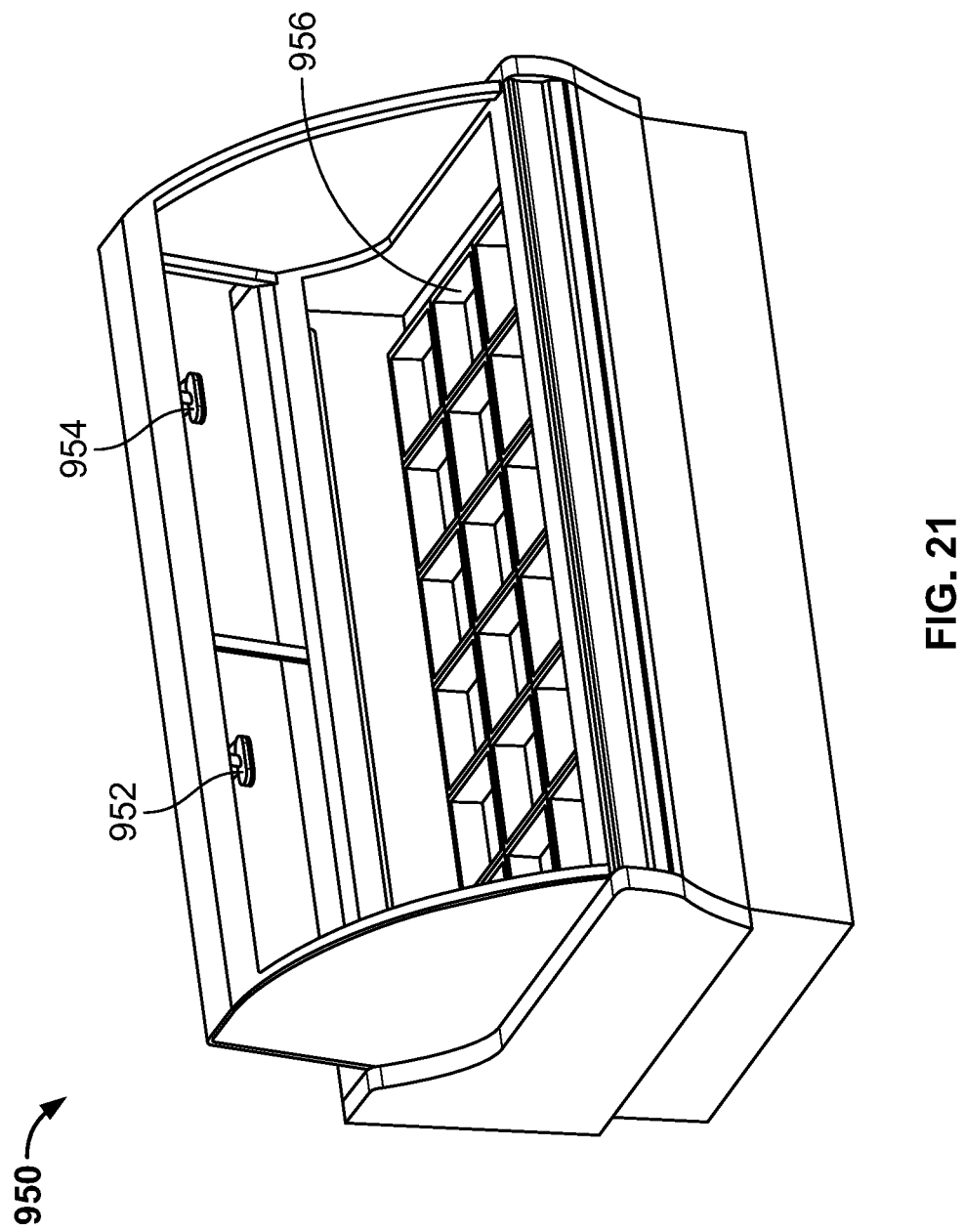
FIG. 21 shows a hot case, and sensors mounted thereon to observe the contents of the hot case to estimate the available quantity of food remaining in accordance with an embodiment of the invention.

With reference to FIG. 21, a hot case 950 having sensors 952, 954 is shown. The sensors are mounted such that the contents of the hot case may be observed to estimate the available quantity of food remaining in accordance with an embodiment of the invention. In embodiments, the sensor module is used to approximate the amount of food remaining in a hot case. This module provides data about remaining food in a hot case to a central computer or computer for computing scheduling food preparation steps. Also, by 'hot case', it is meant a food station that contains unpackaged food that can be accessed by customers directly from the hot case.

The configuration of the hot case may vary. The hot case 950 shown in FIG. 21 includes a plurality of separate spaces to receive separate containers 956. In embodiments, the spaces are operable to warm (or maintain the temperature) the containers placed therein. However, it is to be understood that the subject invention may include station for cooling food. Indeed, a station may present for pickup or access food, whether temperature controlled or not, to the customers. In embodiments, a sensor module comprises one or more sensor from RGB cameras, IR cameras, depth sensors, or any other imaging sensor.

Additionally, in embodiments, the contents of a hot case is shared with other participants in the robotic kitchen (and sometimes also with a main controller or computer) upon which scheduling decisions (e.g., scheduling the food preparation steps) are determined.

Figure 22:
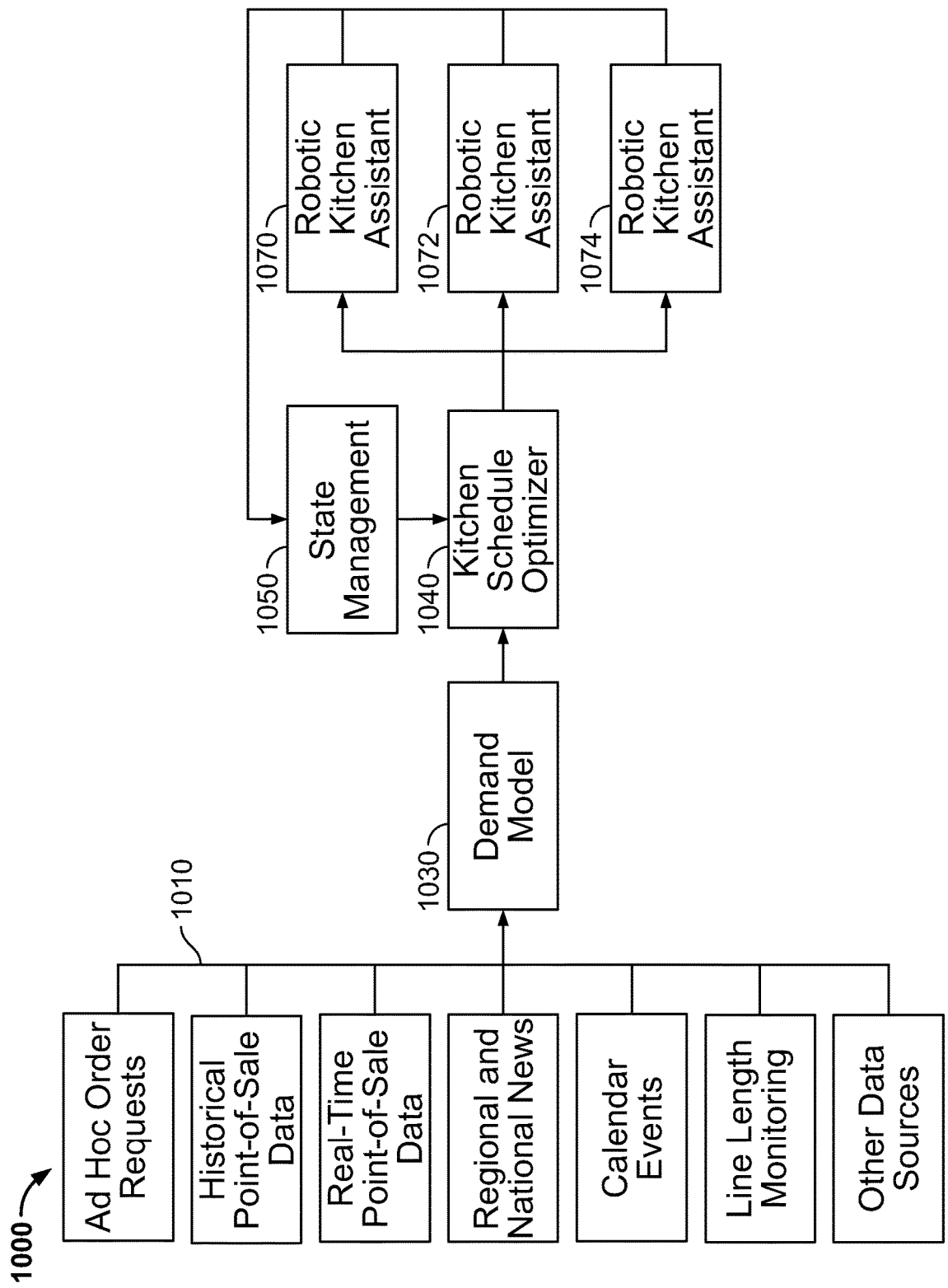
FIG. 22 is a flow chart for a method to control the actions of various robotic kitchen assistants in a robotic kitchen in accordance with an embodiment of the invention.

FIG. 22 is a flow chart for a method 1000 detailing data flow and inputs 1010 in a system that drives a demand model 1030 is then used with a scheduler 1040 to control the actions of various Robotic Kitchen Assistants 1070, 1072, 1074 in a Smart Robotic Kitchen 1000 in accordance with an embodiment of the invention.

Step 1030 states demand model. Inputs 1010 to the demand model shown in FIG. 22 include: ad hoc order requests, historical point of sale (POS) data, real-time POS data, regional and national news, calendar events, line length, and other data sources. Still other data sources may be provided as inputs 1010 including, e.g., a quantity sensor data. The quantity sensor can feed the demand model as described above in connection with FIG. 21. Additionally, in embodiments, historical quantity measurements from many food quantity sensors can be aggregated and used to improve the accuracy of demand prediction leading to a reduction in food waste.

Step 1040 states schedule optimizer. An exemplary scheduling engine is described in U.S. Patent Publication No. 20180345485, entitled "MULTI-SENSOR ARRAY INCLUDING AN IR CAMERA AS PART OF AN AUTOMATED KITCHEN ASSISTANT SYSTEM FOR RECOGNIZING AND PREPARING FOOD AND RELATED METHODS." In embodiments, a central controller aggregates data to drive scheduling decisions for the entire Smart Robotic Kitchen.

In embodiments, Just-in-Time production scheduling is implemented using data from all participants in the Smart Kitchen and drives mechanical devices to produce.

The scheduler then directs or instructs one or more robotic kitchen assistant 1070, 1072, 1074 to perform the various food preparation tasks as described herein.

FIG. 22 also shows state management 1050. State management serves to monitor the state of all tasks of modular robotic kitchen system including for example, current inventory, current preparation step, current state of all items cooking, predicted demand model, executing tasks for robotic systems, and executing tasks of staff. The state management system can allocate tasks to the staff and automation systems to optimally achieve a predicted demand model. This optimization is updated multiple times a minute when the state of the system is updated as food continues to cook, employees succeed or fail in accomplishing tasks, and new orders get placed. An example of a state management system is described in U.S. patent application Ser. No. 16/490,534, filed Aug. 31, 2019, entitled "ROBOTIC KITCHEN ASSISTANT FOR PREPARING FOOD ITEMS IN A COMMERCIAL KITCHEN AND RELATED METHODS", U.S. patent application Ser. No. 16/490,775, filed Sep. 3, 2019, entitled "AUGMENTED REALITY-ENHANCED FOOD PREPARATION SYSTEM AND RELATED METHODS", and U.S. Patent Publication No. 20180345485, filed Aug. 10, 2018, and entitled "MULTI-SENSOR ARRAY INCLUDING AN IR CAMERA AS PART OF AN AUTOMATED KITCHEN ASSISTANT SYSTEM FOR RECOGNIZING AND PREPARING FOOD AND RELATED METHODS", each of which is incorporated by reference in its entirety for all purposes.

Figure 23:
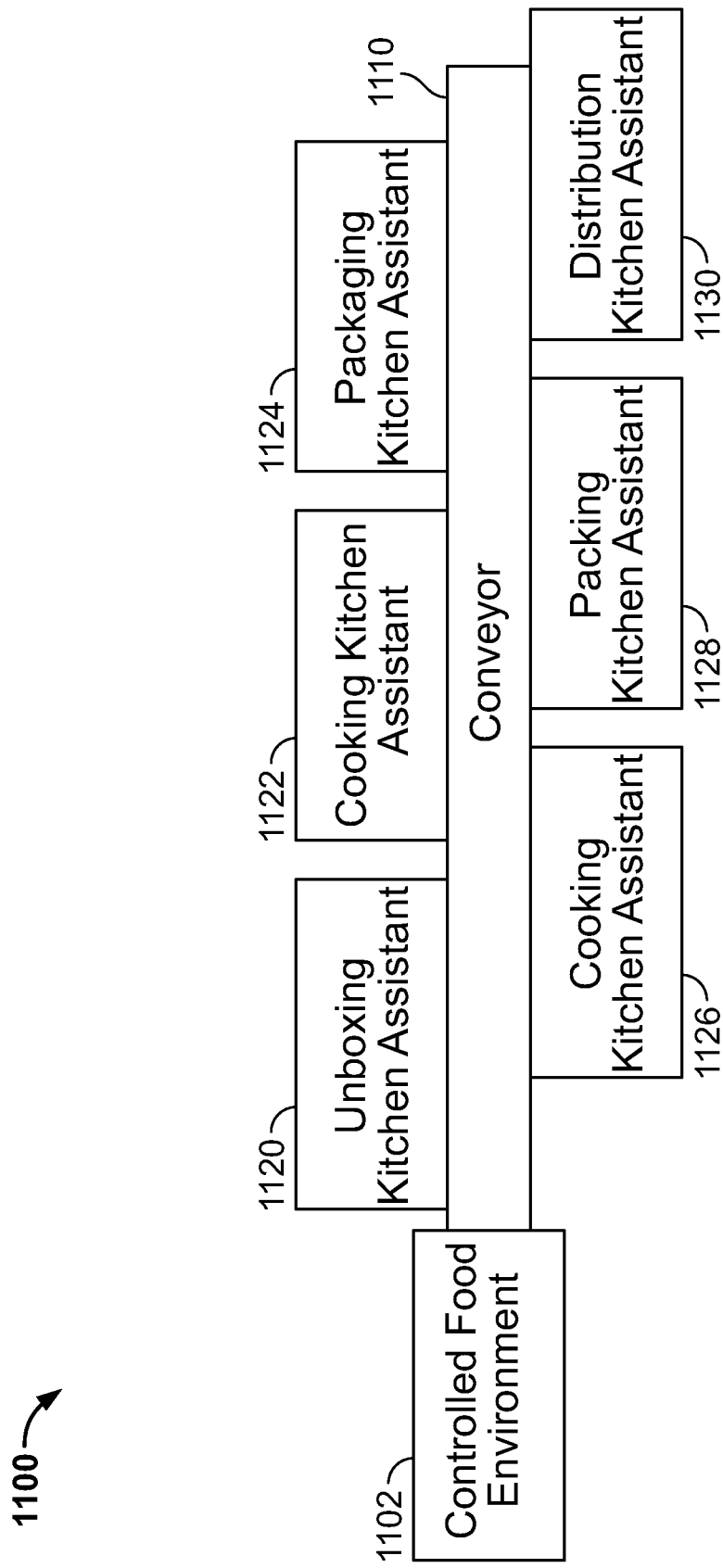
FIG. 23 is a block diagram of a conveyor system for routing food between two or more robotic kitchen assistants in accordance with an embodiment of the invention.

FIG. 23 is block diagram robotic kitchen system 1100 including a conveyor system 1110 in accordance with an embodiment of the invention. The conveyor 1110 is set up to route objects between from a controlled food environment (e.g., a walk-in refrigerator, storage, vehicle) and two or more modular robotic kitchen unit as described herein. The modular robotic units shown in FIG. 23 include an unboxing robotic kitchen assistant 1120, cooking robotic kitchen assistants 1122, 1126, packaging robotic kitchen assistant 1124, packing robotic kitchen assistant 1128, and a distribution robotic kitchen assistant 1130. However, it is to be understood that the number of modular kitchen assistants may vary and be adjusted to suit the kitchen application. An additional modular robotic kitchen cart may be conveniently moved into position and the system is programmed to operate with the additional modular cart as described herein. In embodiments, the conveyor belt assembly comprises a belt, an enclosure surrounding the belt. The enclosure acts as a protective shield to protect moving parts of the conveyor from the food. Additionally, each food item is prepared on a magnetic tray. In embodiments, the conveyor belt has a series of magnets on it. The conveyor is operable to move the magnetic food tray from underneath the protective barrier through a magnetic force.

In embodiments, the conveyor system can include one or more sensors. For example, a sensor module can be arranged on one or more of the carts to obtain image data, or time of flight sensing. The sensor module optionally includes one or more CPUs and GPUs. A processor can be provided that is operable to run convolutional neural networks and geometric analysis of 3D data achieved through stereographic reconstruction, time-of-flight sensing, or other methods.

Novel Fry Basket

Figure 18A:
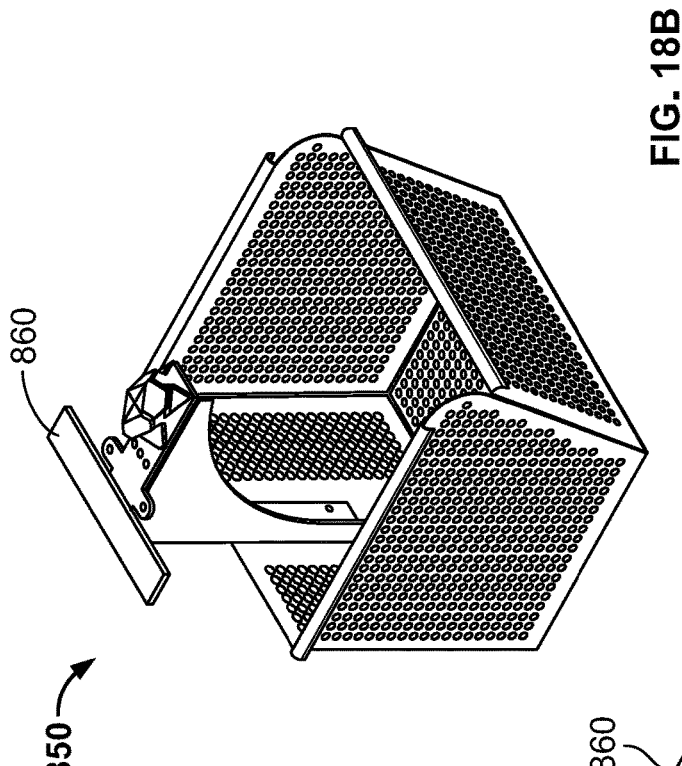
FIG. 18A shows a basket design with computer vision (CV) marker mount plate and diamond in accordance with an embodiment of the invention.
Figure 19:
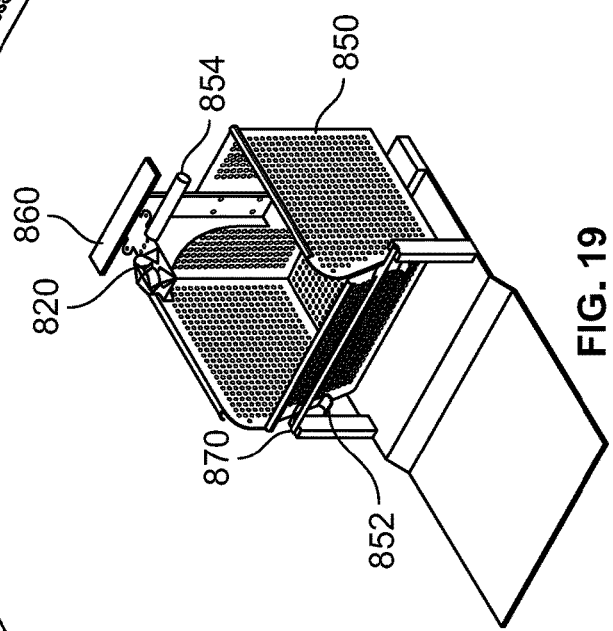
FIG. 19 shows a basket design with implement for easy dumping of basket without lifting full weight of basket in accordance with an embodiment of the invention.

A robotic-friendly fry basket 800 for improved packing efficiency and safety, and reduced payload on humans is shown in FIGS. 18-19.

FIG. 18A shows a basket design 800 with computer vision (CV) marker mount plate 810 and diamond-shaped gripping feature 820. The marker mount facilitates location of the basket in 3D space, and the gripping feature makes it easier for the robot arm to pick up the fryer basket despite tolerance stacking errors. Examples of the CV marker and gripping feature are described in U.S. patent application Ser. No. 16/534,207, filed Aug. 7, 2019, and entitled "ROBOTIC KITCHEN ASSISTANT INCLUDING UNIVERSAL UTENSIL GRIPPING ASSEMBLY", incorporated herein by reference in its entirety for all purposes.

Figure 18B:
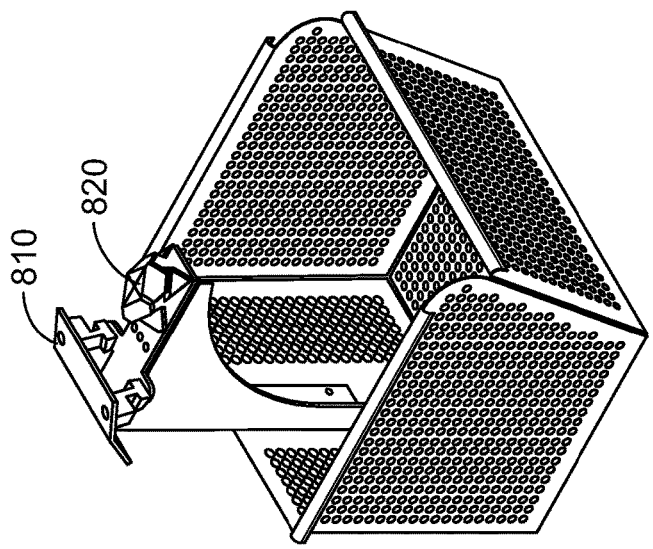
FIG. 18B shows a basket design with T-shaped feature on top of basket to add more vertices to object with sharp edges in accordance with an embodiment of the invention.

FIG. 18B shows a basket design with T-shaped feature 860 on top of basket to add more vertices to the object with sharp edges. In embodiments, the basket is designed with features that add additional sharp vertices for computer vision to pick up on. In embodiments, a fryer basket has additional sheet metal features with sharp gradients to enable easy detection and localization via machine learning and traditional classifier algorithms (see Viola-Jones-type classifiers and AlexNet for examples of what is detectable algorithmically via computer vision https://www.cs.cm-u.edu/~efros/courses/LBMV07/Papers/viola-cvpr-01.pdf).

FIG. 19 shows a basket design with implement 870 for easy dumping of basket without lifting full weight of basket. The basket 850 is shown having an inverted hook 852 on the front to engage with a horizontal bar 870 on a workspace as a pivot. This enables the basket to be dumped without lifting the entire weight of the basket. In embodiments, the basket has a handle 820 for a robot and a separate handle 854 for a human. Consequently, the basket handle is designed in a way that both a human and a robot can grab the same handle.

Some of the advantages of the basket described above includes enabling a method for containing food for cooking in a fryer while enabling computer vision localization of basket; reducing time required to clean after use; and protecting the human worker. Additionally, in embodiments, smaller baskets are provided and used with the modular robotic system. Maintaining packing efficiency in a fryer while decreasing payload requirements can be accomplished by using many smaller baskets.

ALTERNATIVE EMBODIMENTS

Figure 24B:
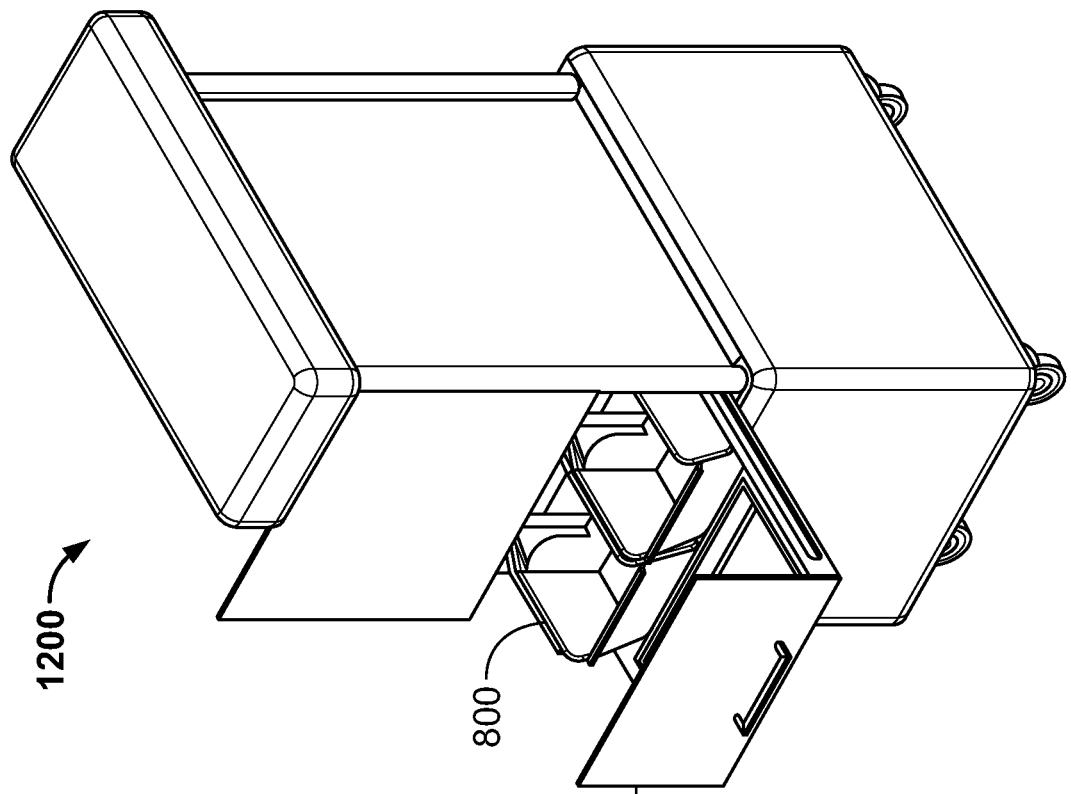
FIGS. 24A, 24B show a modular robotic kitchen unit comprising a human-robot drawer interface in closed configuration and open configuration, respectively, in accordance with an embodiment of the invention.
Figure 24A:
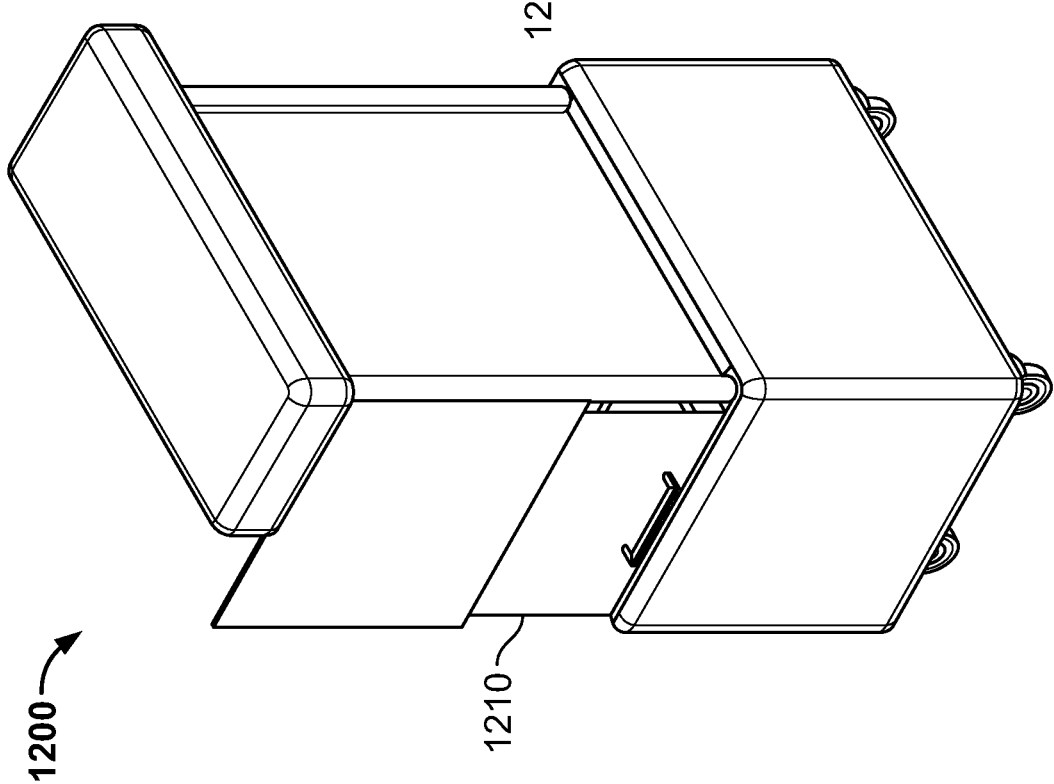

It is to be understood that the modular robotic kitchen system may vary widely except as recited in the appended claims. For example, in another embodiment, and with reference to FIGS. 24A, 24B, a modular robotic cart 1200 is shown including a drawer 1210 which grants access to the robotic arm within the shielded workspace 1220, and which limits access to the human worker. In contrast, when the drawer is in the open configuration 1210', the robotic arm is prohibited from accessing the drawer, and the human worker has access to add or remove contents. In a sense, the novel drawer design provides a safe human-robot interaction interface to supply and withdraw food items to the robotic modular cart.

In embodiments, the modular cart may contain a tool belt to hold a variety of tools including measuring tools, gripping tools, and calibration tools.

In embodiments, the modular cart may have several fixed fiducial markers to provide constant feedback on calibration accuracy and allow instantaneous calibration.

Figure 25:
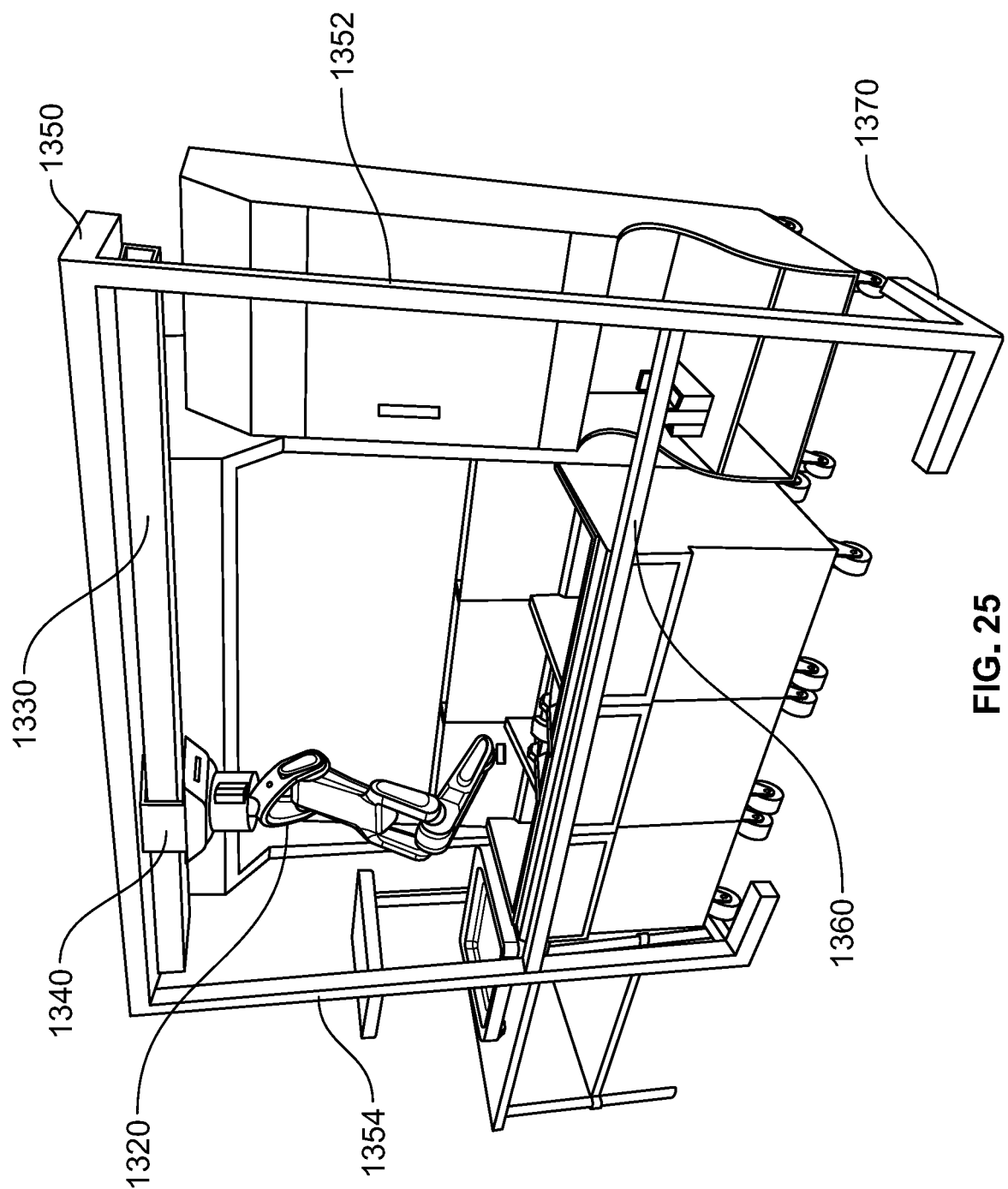
FIG. 25 shows a robotic linear guide rail system mounted on a frame above the cooking area in accordance with an embodiment of the invention.

In embodiments, and with reference to FIG. 25, one or more of the modular robotic arm modules described above may be replaced (or supplemented) with a frame-mounted linear guide system.

In the embodiment shown in FIG. 25, a robotic arm 1320 is shown coupled to an upper guide rail 1330 via movable base carriage 1340. The upper guide rail is mounted to a portable frame 1350. In the embodiment shown in FIG. 25, the frame 1350 comprises support legs 1352, 1354 and at least one cross beam 1360 upon which the upper guide rail is fastened.

Feet 1370 are shown extending from the legs at right angles from the legs for stability. Optionally, the feet may be mounted to the floor.

The carriage and guide cooperate together to axially move the robotic arm along the guide when commanded to do so by the computer processor, which may be located locally, as described above.

Although the linear guide system shows one robotic arm, the invention is not so limited except where recited in the appended claims. The linear rail guide system may include additional robotic arms movable along the rail to further increase the effective reach of the robotic arms. The computer and sensors operate together to determine the food preparation steps, recognize and locate the food items and utensils, and to schedule and carry out the order efficiently.

Additionally, the linear guide system may be oriented variously. In embodiments, a linear guide system extends from the front towards the back (or from the top to bottom) of the cooking area. In addition to such axial motion, the robot manipulator itself enjoys several other degrees of motion (multi-axis). Consequently, the linear guide systems can perform any of the skills and applications described above such as those identified in FIG. 5.

The linear movement may be generated using a number of different linear movement systems. In embodiments, a cleanable linear actuator design extends the reach of one or more manipulators. In one embodiment, the linear actuator is composed of a ball screw mechanism with thread and pitch size large enough to easily clean between the threads.

The frame may be made of various materials. In embodiments, the frame is formed of steel tubing, welded together.

Additionally, the linear actuator may be covered to protect it. In embodiments, a barrier is shaped to cover the sliding mechanisms from any splashes from food production. A cover allows access of the carriage to move freely along the rail.

Still other techniques may be employed by the robotic kitchen assistant to automatically remove debris from the fryer including rapidly contacting the rim of a trash receptacle with the skimmer, or brushing the skimmer with a tool.

Automated Bins

Figure 26A:
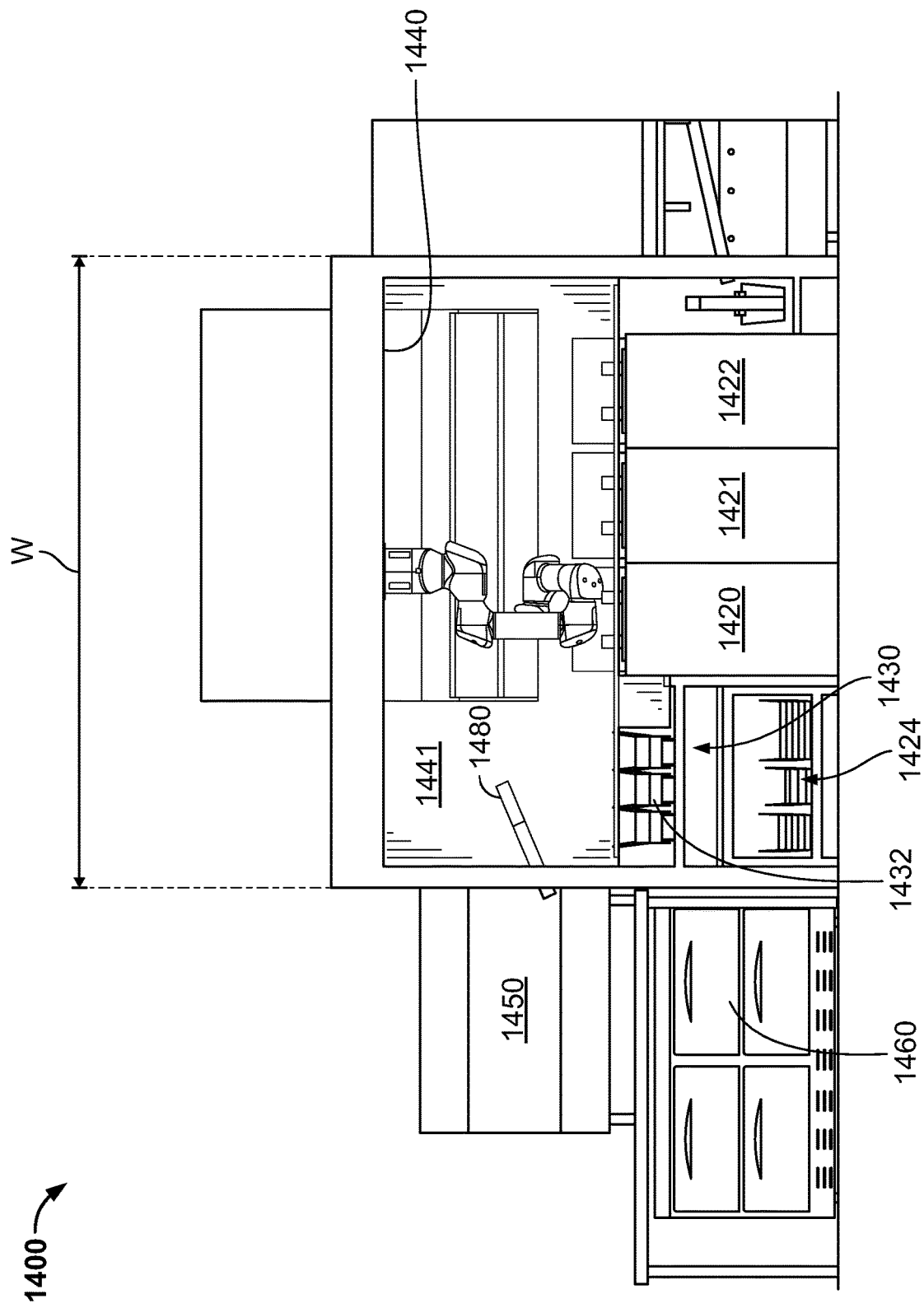
FIGS. 26A, 26B show, respectively, a front and left side view of a robotic kitchen system comprising a plurality of automated bins in accordance with an embodiment of the invention.

FIG. 26A shows another robotic kitchen system 1400 for preparing food in a restaurant environment in accordance with an embodiment of the invention. The robotic kitchen system 1400 is shown having robotic arm 1410, a plurality of fryers 1420-1422, automated bin station 1430, frame enclosure 1440, safety glass 1441, hot food station 1450, and food storage 1460. One or more programmed processors, not shown, can be located within the enclosure, elsewhere in the vicinity, or cloud-based for operating the robotic arm, processing image data from cameras and sensors, and for controlling cooking equipment and other components such as the automated bins described herein. Indeed, more or fewer components may be included in the system and the invention is not intended to be so limited except as where recited in the appended claims.

Preferably, the robotic arm 1410 is operable to move laterally along a guide or rail mounted to the top of the frame 1440. In embodiments, this extends the reach of the robotic arm to the full length of the enclosure.

Figure 26B:
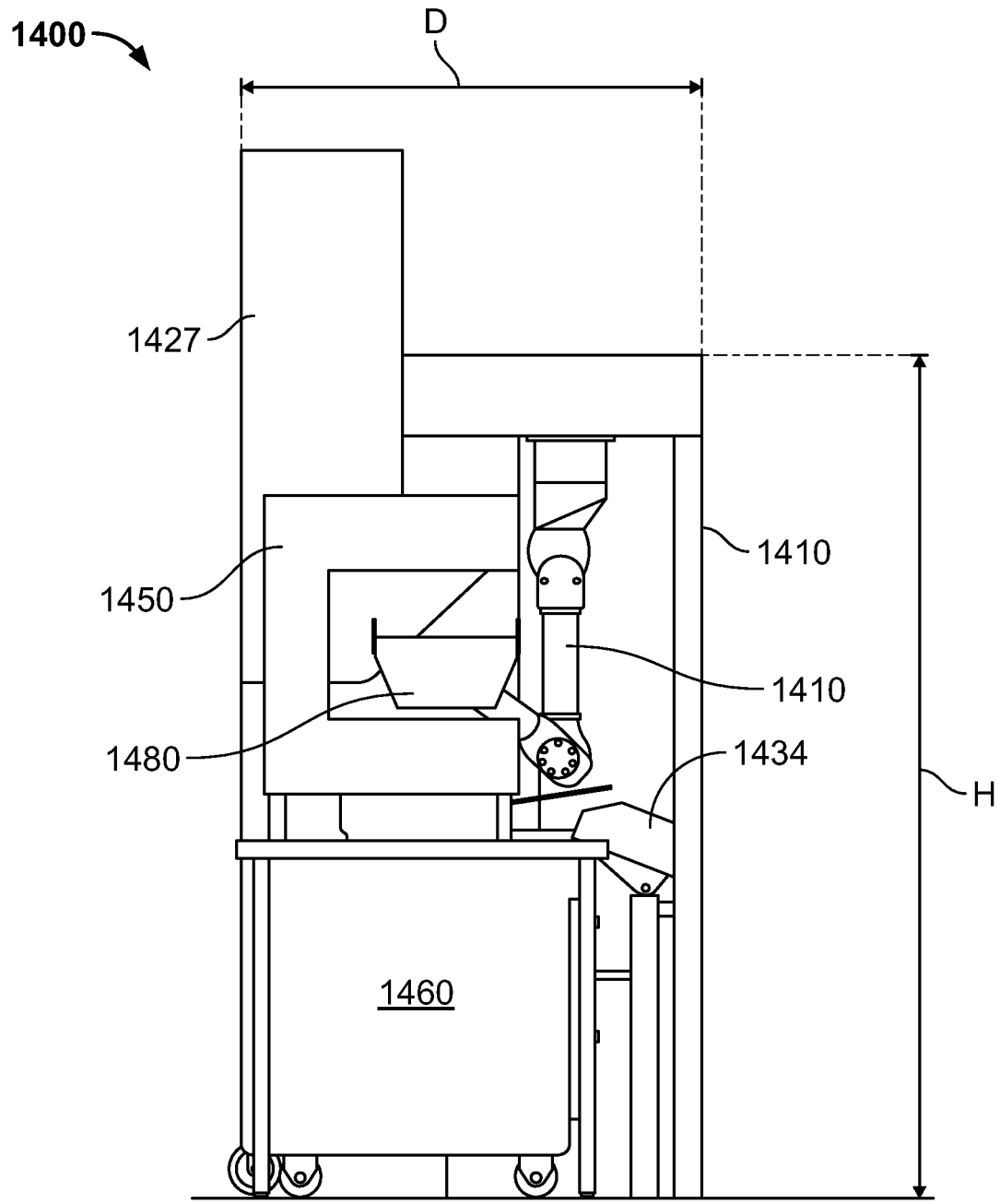

The size of the enclosed robotic kitchen system may vary. Preferably, the enclosure is small, has a small profile and footprint. In the embodiment shown in FIGS. 26A, 26B, the robotic kitchen system 1400 includes three fryers 1420-1422, a robotic arm 1410, hood 1427, and automatic bin station 1430. An exemplary width (W) for the robotic kitchen system 1400 ranges from 80 to 130 inches, and more preferably is between 90 and 100 inches. An exemplary depth (D) for the robotic kitchen system 1400 ranges from 40-60 inches and more preferably is between 40-45 inches. An exemplary height (H) for the robotic kitchen system 1400 ranges from 75-100 inches and more preferably is between 75-85 inches.

FIGS. 27-28 are enlarged perspective views of bin station 1430 illustrating bin 1442 in a first position for receiving food and a second position for dumping the food, respectively. Food can be placed by a worker or otherwise deposited in the bin while the bin is in the first position shown in FIG. 27. At least a portion of the bins is shown protruding through window or opening in safety glass 1441. Consequently, the human worker is not in physical contact with the robot, fryer, basket, and hot oil as the case may be.

With reference to FIG. 28, bin 1442' is shown in a second actuated position and any food placed in the bin is gravity fed into the basket 1490. The basket 1490 is manipulated within the enclosure by robotic arm 1410 shown in FIG. 26, and as described herein.

Figure 29:
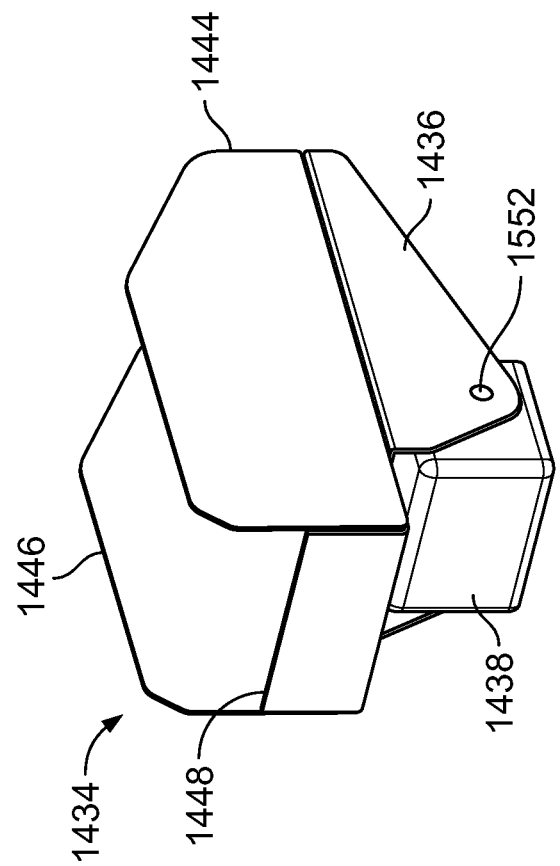
FIG. 29 is an enlarged perspective view of an automated bin in accordance with an embodiment of the invention.

FIG. 29 shows an enlarged view of a bin 1434. The bin 1434 is shown having two parallel side walls 1444, 1446, and a front wall or lip 1448, collectively defining a cavity or channel for food to be placed and held when the bin is in the first position. In embodiments, the floor of the cavity is flat and makes an angle downward between 10-45 degrees when the bin is in the first position 1442. However, as described herein, the bin floor may be curved or incorporate other features to channel food items to a target area.

Indeed, it is to be understood that the shape of the bin may vary.

Consequently, when food is placed in the bin, the food tends to accumulate in the cavity and against the inner surface of lip 1448.

The bin shown in FIG. 29 is removably locked with mounting bracket 1436. A wide range of mechanical interlocking features can removably hold the bin to the bracket including for example, without limitation, peg/hole, guide/ridge, slots, fasteners, etc.

The mounting bracket is coupled to the drive shaft 1552 of the motor 1438. For example, it can be attached by a shaft collar with a keyway. However, other means may be used to couple the mounting bracket to the drive shaft of the motor such as a press fit. When the motor is activated, the drive shaft rotates, moving the attached mounting bracket. This causes the bin to rotate from the first position to the second position or vice versa. The second position may go beyond 90° in some cases to help with certain food types which do not slide as easily. Although a motor and rotating drive shaft are described in connection with FIG. 29, the invention is not intended to be so limited. Other types of actuators may be employed to move or rotate the bin.

Figure 30:
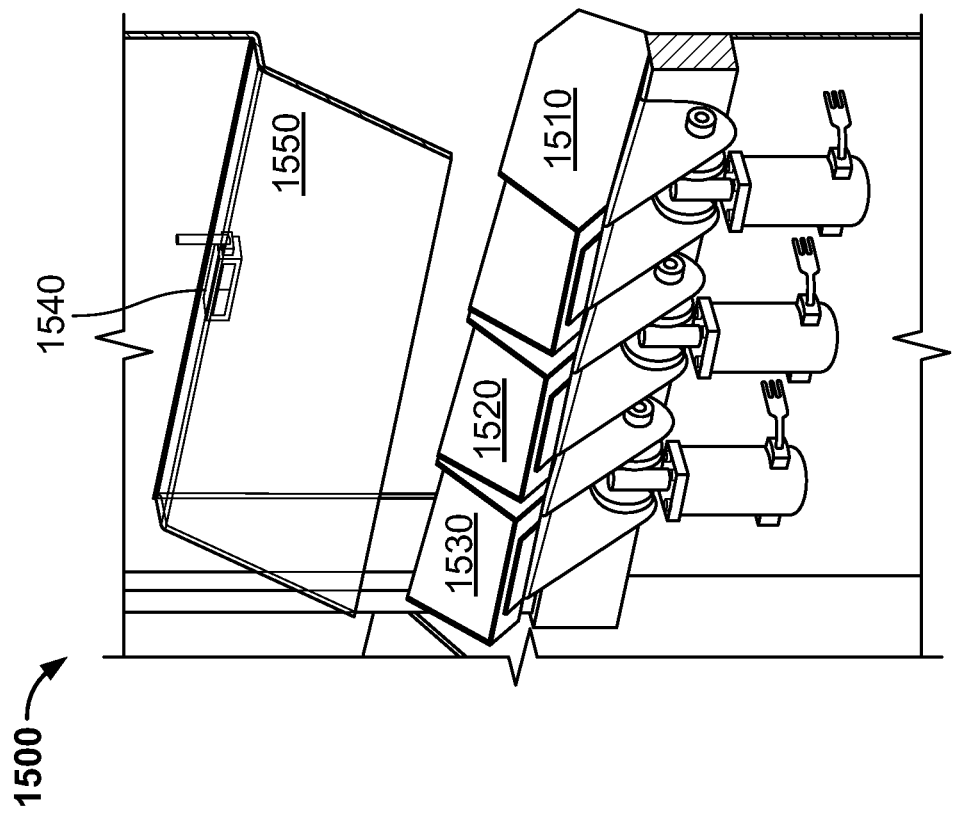
FIG. 30 shows an enlarged perspective rear view of an automated bin station in accordance with an embodiment of the invention.

With reference to FIG. 30, a rear view of an automated bin station 1500 is shown in accordance with another embodiment of the invention. Automated bin station is shown having three bins 1510,1520,1530 each of which has a dedicated mounting bracket and motor. The bins are sloped downward toward the front.

A sensor array 1540 is shown mounted on safety shield 1550. As described herein the sensor array may comprise a camera and supplies image data to the programmed processor for monitoring the position, contents and movement of the bins.

Figure 31:
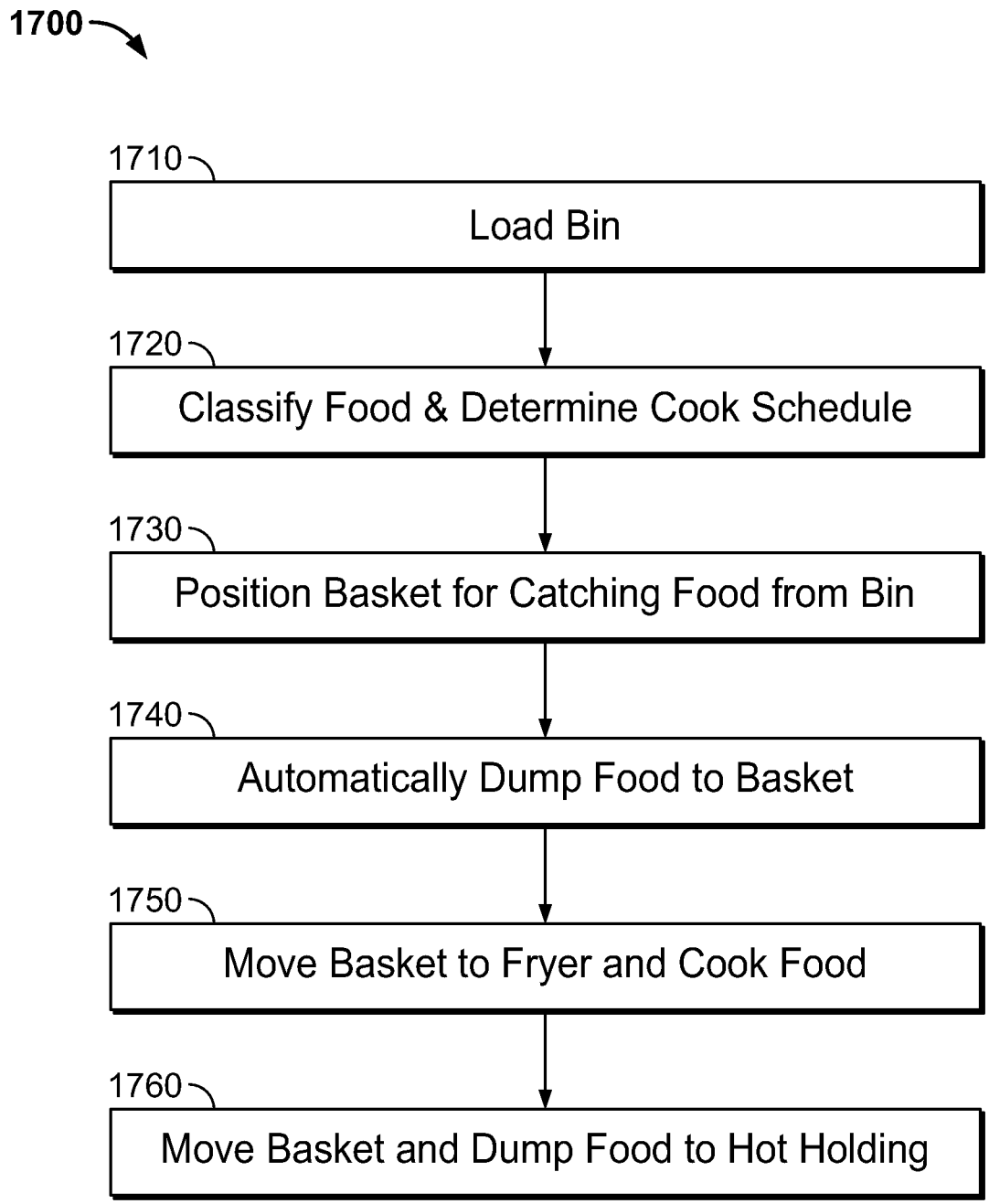
FIG. 31 is a flow chart for a method to receive food, cook and transfer hot food to a holding area in accordance with an embodiment of the invention.

FIG. 31 is a flow chart for a method 1700 to receive food, cook and transfer hot food to a holding area in accordance with an embodiment of the invention.

Step 1710 states to load bin. An example of a bin 1434 is shown in FIGS. 26-29. The front end of the bins protrude from an opening in the safety shield 1441. A human or robot may gather food from a storage area such as cold storage 1460 and dump the food into the bin(s). Preferably, as shown, the bins are arranged for a "direct drop" from the bag into the bin. The bin contains the food within the parallel walls 1444, 1446 and lip 1448 of the bin. The bin is arranged rotated or tilted forward into the first position such that the food remains in the bin, and does not slide out the open rear end of the bin. A wide range of types of food, whether fresh or frozen, may be added to the bin such as, for example, fries, chips, chicken, vegetables, fish, etc. Desirably, the entire loading step 1710 is performed outside of the enclosure defined by frame 1440 and shield 1441, thereby physically separating the worker from the moving robotic arm, cooking equipment, and potentially dangerous hot equipment and materials such as hot baskets, hot cooking oil.

Additionally, in embodiments, the bins are removable from the mounting brackets for convenient food scooping and cleaning. The bins may also vary in size and shape. The bins may be sized to accommodate a restaurant's menu or needs.

Bins may also be color coded. Color-coded bins add to safety by assisting food prep workers to avoid food cross-contamination (i.e., shellfish or dairy-based can remain separate from other foods). In embodiments, the bins are configured to be stackable with one another and can be stored in a stacked arrangement 1424 as shown in FIG. 26.

Step 1720 states to classify food and determine cook schedule. As described herein, the food is classified using a programmed processor and based on image data from cameras aimed at the food bins. The processor further is operable to determine an optimal schedule to cook the food in the bin in view of the current state of the system.

Step 1730 states to position basket for catching food from bin. With reference to FIG. 27, the robotic arm manipulates the basket 1490 beneath the rear end of the bin holding the food.

Step 1740 states to automatically dump the food to the basket. With reference to FIG. 28, the bin is moved (preferably rotated) to a second "dumping" position 1442', causing the food within the bin to slide rearwardly into the basket 1490.

Step 1750 states to move basket to fryer and cook food. With reference to 26A, robotic arm 1410 is operable to move basket 1490 into one of the fryers 1420-1422 and the automated bins are returned to the first position shown in FIG. 27.

The processor is operable to determine the cooking time, duration, and optionally, measure the doneness as discussed herein. The system is operable to cook multiple foods in parallel arising from the multiple automated bins and fryers. Although three automated bins are shown, more or less automated bins may be incorporated into the design. For example, a modular automated bin station may be positioned on each side of the fryers and within the safety shield.

Figure 32B:
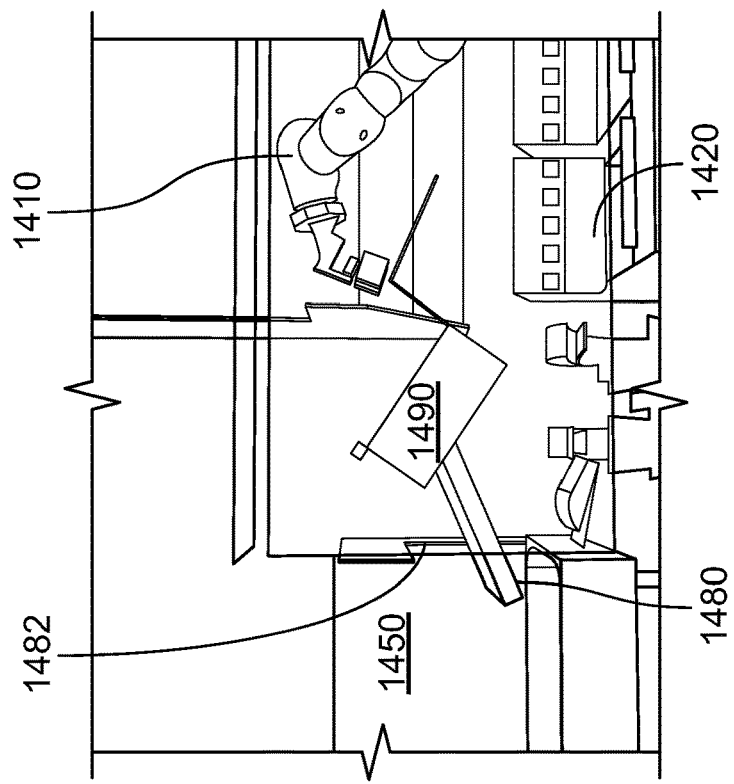
FIGS. 32A, 32B show an upper front perspective view and a front view, respectively, of a robotic kitchen arm manipulating the fry basket to hot food ramp in accordance with an embodiment of the invention.
Figure 32A:
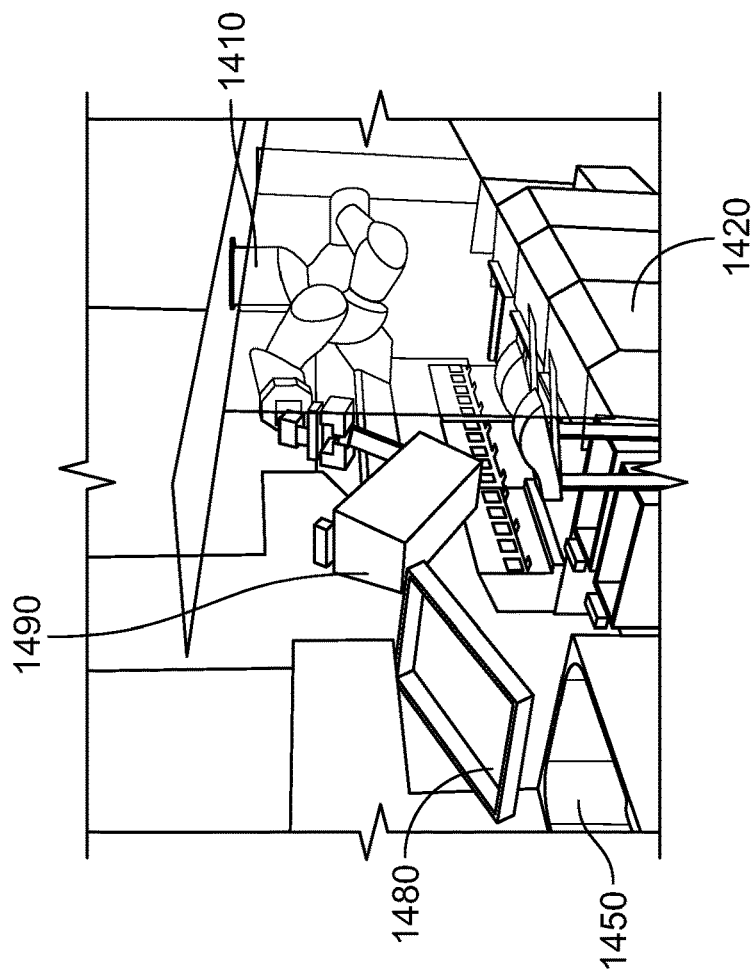

Step 1760 states to move basket and dump food to hot holding. With reference to FIGS. 32A, 32B, and after the food is cooked in the fryer 1420, the robotic arm 1410 moves basket 1490 to slide, chute, or ramp 1480. The timing and position of the robotic arm is controlled by the processor and state of the system based on recipe information and camera image data. The robotic arm, while within the enclosure, dumps the cooked food onto ramp 1480. The food falls/slides downward, through an opening 1482 in the safety shield, and into hot holding area 1450 where the cooked food may be sorted and bagged.

Figure 33:
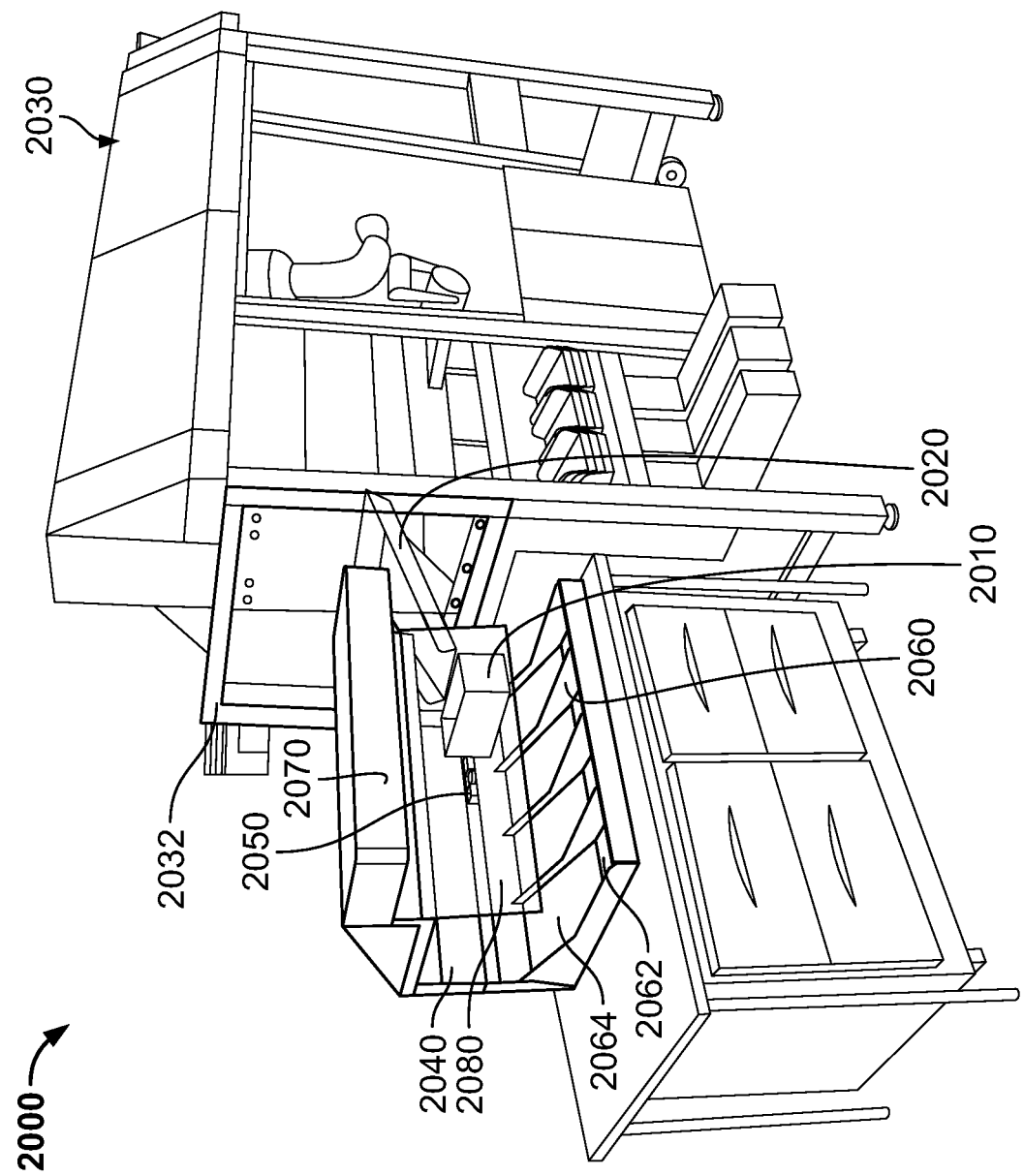
FIG. 33 shows an automated sorting system in accordance with an embodiment of the invention.

FIG. 33 shows a food item sorting assembly 2000 in accordance with another embodiment of the invention. The food item sorting assembly 2000 is shown having a food bin 2010 positioned underneath an outbound edge of chute 2020. A linear rail 2040 and tilt motor 2050 are operable to move the bin along the rail. A computer (e.g., the computer described above for controlling the robotic arm) is programmed and operable to direct the bin to a desired food holding tray 2060, where the bin can be rotated to dump the food items into the desired location.

Each food holding tray 2060 includes a ramp (or chute) portion 2064 which guides or channels the food dumped thereon towards the lower base portion 2062. The human workers (not shown) may access the food items in the base portion of the food stations 2060.

Although four food holding trays 2060 are shown in FIG. 33, the invention is not intended to be so limited. More or fewer food holding trays may be incorporated into the sorting system.

Optionally, a heat lamp 2070 is arranged above one or more of the food holding trays to keep the food warm.

Optionally, a safety shield 2080 is arranged between the food bin 2010 and the human workers. The shield 2080 is shaped to cover bin, rail and motor yet permit food items to fall into the base of the food tray. More specifically, in the embodiment shown in FIG. 33, the shield 2080 is (a) vertically arranged above the base 2062 of the food holding tray and (b) set back from the proximal edge of the tray. Consequently, the human workers can access to the food items dumped into the tray yet are prohibited from contacting the moving components of the automated sorting system (e.g., the motor, bin, etc.).

Figure 34C:
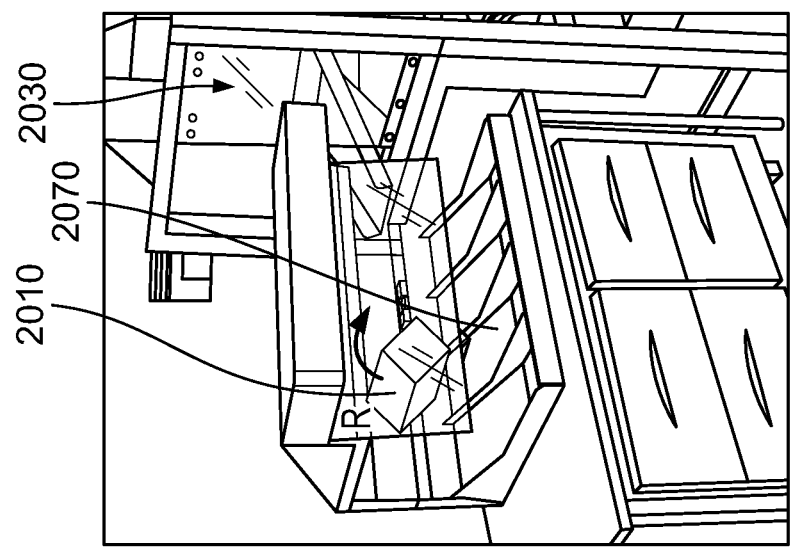
FIGS. 34a-34c sequentially illustrate an automated sorting system positioning a sorting bin under a chute to catch food items, laterally transporting the sorting bin over a food holding tray, and rotating the sorting bin to dump the food items into the food holding tray.
Figure 34B:
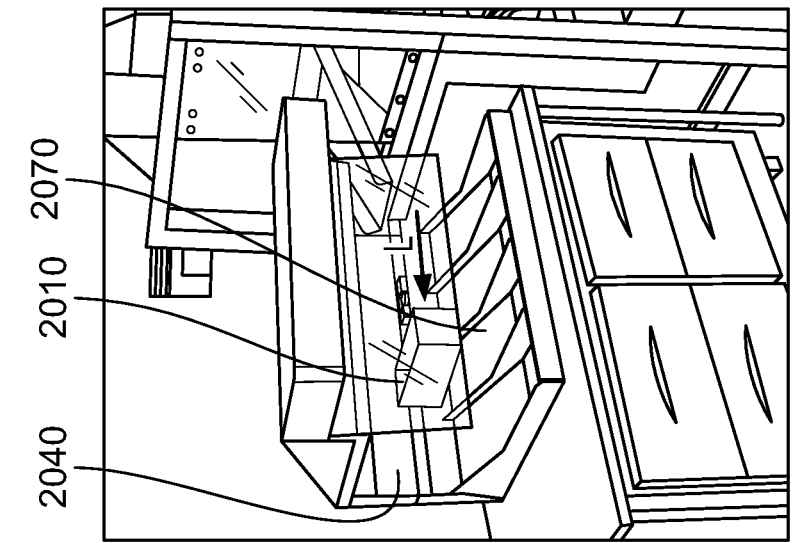
Figure 34A:
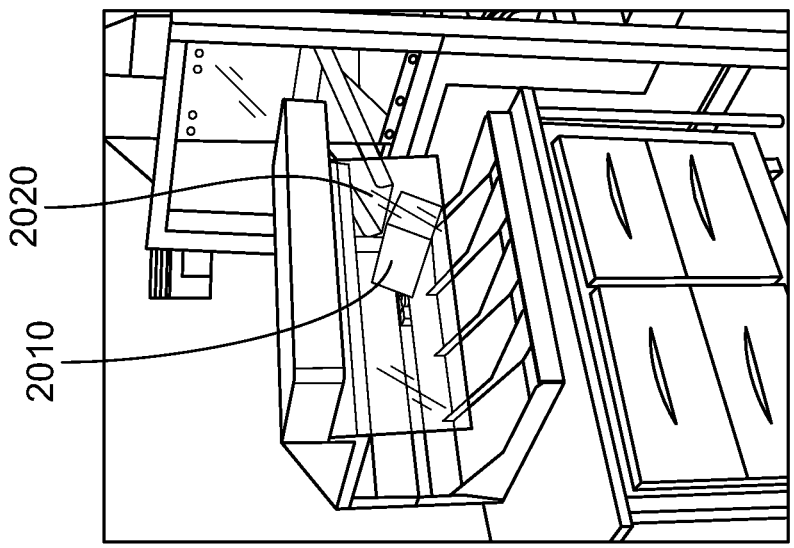

FIGS. 34a-34c illustrate sequential steps in a method for sorting food items in accordance with one embodiment of the invention. With reference to FIG. 34a, a food bin 2010 is shown positioned at a slight angle and below the chute 2020 for receiving food items from the chute. The chute 2020 protrudes through a window of the robotic arm enclosure.

It is to be understood that the food item sorting systems described herein may also be operable with and/or receive food items from a wide variety of sources not limited to robotic systems. Sources may include, without limitation, human workers, automated equipment, or other systems whether robotic or non-robotic based.

FIG. 34b shows the food bin 2010 transported laterally (L) along the linear rail to a desired location above a desired food holding tray 2070.

FIG. 34c shows rotating (R) the food bin 2010 to dump the food into the desired food holding tray 2070.

Optionally, the bin may be returned to the position shown in FIG. 34a, namely, home position.

The sorting system desirably operates automatically to sort a wide variety of foods received from the robotic arm enclosure 2030. The sorting system includes a computer (preferably the same computer used for the robotic arm) to determine how to position and orient the food bin, and the timing to do so. In embodiments, the sorting system is operable to place food items into the different food holding trays based on the type of food.

Optionally, the system stores the location of the food, food identify, time at the location, and food status in memory. Optionally, the computer activates an alert after a threshold time or condition is met. For example, if the amount of time the food is located in the food holding tray exceeds a threshold time for freshness, an alert is activated.

The type of alert may vary. Examples of alerts include audio sounds and display graphics intended to notify the human worker to remove the food from the food holding tray. The human worker may input the status of the order or optionally, the sorting system may be provided with sensors or cameras to obtain image data of the food holding tray areas in order for the computer to compute the status and state of the food in each of the food holding trays. The state of the system is then updated for inventory in food holding areas.

Optionally, the computer is programmed to maintain inventories in the food holding trays. First, inventory states are automatically determined based on quantity observed, freshness or time in holding areas, food types, and order anticipation (e.g., increase inventory during rush periods). Preferably a trained model for the food holding trays is incorporated into the system to recognize or estimate the quantity of food present in a food holding tray. Such a model may be a computer vision model (e.g., a CNN model) and trained by placing different known quantities of food in each of the trays and instructing the model as to the actual quantity present in the tray. Features or inputs to the model include the type of food item, diameter or characteristic length, etc.

Additionally, the computer may be programmed to compute the temperature in hot food holding areas based on image data or temperature sensors. An alert or notification may be computed and sent to the human worker when the temperature exceeds a threshold value. In embodiments, the hot food holding model is trained to recognize the temperature of the food items in the food holding bins based on thermal signatures arising from thermal cameras or sensors.

Additionally, in embodiments, data is perpetually collected from the multiple sorting and automated bin stations and sent to a remote server (e.g., a cloud based server) for aggregating and/or training a comprehensive model to recognize ingredients placed in the bins, track food holding times, compute temperatures, etc.

The computer then evaluates whether to instruct or notify the worker to carry out a task. Examples of tasks include, without limitation (a) to add or supply more food to the tray based on the inventory levels or (b) to throw away the food in the food holding areas if the food is determined to be expired.

Advantages of embodiments of the robotic kitchen system with automated bins and sorting, and related methods, include without limitation: (a) robot-free safety zone, by use of an entirely enclosed system serving to protect humans from hazardous equipment and materials (no human-robot working zones); (b) contamination control, by use of color-coded bins to facilitate adherence to standard operating procedures, specifically those designed to prevent cross-contamination; (c) optimizes human labor time by automating certain steps in the cooking, namely, frying process; (d) robustness, namely, tireless low maintenance robotic action; (e) flexibility, namely, the system accepts wide range of types of foods regardless of shapes, size, and quantity; (f) safety, by physically separates human from moving robotic equipment and minimizing or eliminating need of safety sensors; (g) manually lifting baskets is eliminated as well as slip and falls in vicinity of fryers; (h) less food contact with human and equipment reduces chances of contamination; (i) automatic sorting to storage trays, and (j) modularity, the system is modular and expandable.

The invention claimed is:

1. In a work environment requiring a human to collaboratively work with a robot, a method for securing a robot workspace from a human workspace to protect the human from injury arising from contact with the robot comprising:
   providing an automated station assembly arranged within the robot workspace wherein said automated station assembly comprises a plurality of separately movable object collection zones, each of which being independently positionable from within the robot workspace, through a window in a physical barrier, and into the human workspace;
   automatically, via the automated station assembly, positioning at least one of the object collection zones from within the robot workspace, through the window in the physical barrier, and into the human workspace, said physical barrier separating the human workspace from the robot workspace;
   receiving, from a human, food into one of said object collection zones;
   continuously generating image data of the plurality of object collection zones;
   detecting and classifying food placed into the object collection zones based on the image data;
   determining, via a cooking scheduling module, a schedule to cook the food based on a category of the food, recipe information, and a current system state;
   automatically manipulating the object collection zone that received the food from the human workspace, through the physical barrier, and to the robot workspace, wherein the manipulating step is performed by the automated station assembly independent of the human and robot;
   automatically positioning via the robot within the robot workspace a cooking tool under one of the plurality of object collection zones based on which object collection zone received the food as determined by the detection and classification step;
   dumping the food from the object collection zone into the cooking tool; and
   performing, within the robot workspace, at least one cooking step on the food according to the recipe information and schedule.

2. The method of claim 1, wherein the object collection zone is a portion of a bin or chamber.

3. The method of claim 1, wherein the cooking tool is a fry basket.

4. The method of claim 1, further comprising robotically moving the cooking tool to dump the food onto a pathway, wherein the pathway is configured to transport the food from inside the robot workspace to outside the robot workspace.

5. The method of claim 4, wherein the pathway is a chute, and the chute is arranged with a downward sloping angle to transport the food based on gravity.

6. The method of claim 1, wherein the automated station assembly comprises a plurality of computer controlled bins, each of which is adapted to rotate or tilt from a first orientation to receive the food from the human in the human workspace, to a second orientation to position the food inside the robot workspace.

7. The method of claim 6, further comprising vibrating at least one of the bins.

8. The method of claim 1, wherein the step of generating image data is performed by a sensor array, optionally comprising a camera.

9. The method of claim 1, wherein the cooking step is performed by frying.

\* \* \* \* \*